US008613082B2

(12) United States Patent
Aono et al.

(10) Patent No.: US 8,613,082 B2
(45) Date of Patent: Dec. 17, 2013

(54) LICENSE MANAGEMENT SERVER, LICENSE MANAGEMENT METHOD, AND COMPUTER PROGRAM PRODUCT

(75) Inventors: Yoshiko Aono, Kanagawa (JP); Motoyuki Katsumata, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 343 days.

(21) Appl. No.: 12/923,149

(22) Filed: Sep. 7, 2010

(65) Prior Publication Data

US 2011/0061102 A1 Mar. 10, 2011

(30) Foreign Application Priority Data

Sep. 7, 2009 (JP) ................................. 2009-206301

(51) Int. Cl.
*H04L 29/06* (2006.01)
(52) U.S. Cl.
USPC .......................................................... 726/21
(58) Field of Classification Search
USPC .......................................................... 726/21
See application file for complete search history.

(56) References Cited

U.S. PATENT DOCUMENTS

| 5,671,412 | A * | 9/1997 | Christiano | 1/1 |
| 5,754,763 | A * | 5/1998 | Bereiter | 726/28 |
| 6,219,652 | B1 * | 4/2001 | Carter et al. | 705/59 |
| 6,411,941 | B1 * | 6/2002 | Mullor et al. | 705/59 |
| 6,574,612 | B1 * | 6/2003 | Baratti et al. | 705/59 |
| 7,343,297 | B2 * | 3/2008 | Bergler et al. | 705/59 |
| 7,537,205 | B2 | 5/2009 | Nagata et al. | |
| 2002/0138441 | A1 * | 9/2002 | Lopatic | 705/59 |
| 2003/0072448 | A1 * | 4/2003 | Nakamura et al. | 380/243 |
| 2006/0106925 | A1 | 5/2006 | Song et al. | |
| 2007/0180236 | A1 | 8/2007 | Kuroyanagi et al. | |
| 2007/0223068 | A1 | 9/2007 | Ishii et al. | |
| 2007/0279667 | A1 | 12/2007 | Hattori et al. | |
| 2008/0016450 | A1 | 1/2008 | Aono | |
| 2008/0249961 | A1 * | 10/2008 | Harkness et al. | 705/400 |
| 2008/0263624 | A1 * | 10/2008 | Nakahara et al. | 726/1 |
| 2008/0276165 | A1 | 11/2008 | Aono | |
| 2009/0055764 | A1 | 2/2009 | Katsumata | |
| 2009/0064002 | A1 | 3/2009 | Katsumata et al. | |
| 2009/0064050 | A1 | 3/2009 | Aono | |

FOREIGN PATENT DOCUMENTS

| CN | 101061688 A | 10/2007 |
| JP | 2006-040262 | 2/2006 |
| JP | 2007-249804 | 9/2007 |
| JP | 2008-243179 | 10/2008 |

OTHER PUBLICATIONS

Chinese Office Action dated Mar. 7, 2013 for corresponding Chinese Application No. 101061688 (full translation provided).

\* cited by examiner

*Primary Examiner* — Michael S McNally
(74) *Attorney, Agent, or Firm* — Harness, Dickey & Pierce, P.L.C.

(57) ABSTRACT

A license management server connected to an MFP includes an activating unit that, upon receiving an application activation request from the MFP, accesses a license management DB, and, when the number of licenses associated with a product key of the application in the license management DB is one or greater, grants a license for the application to the MFP and cancels the license for the application granted to the MFP upon receiving a deactivation request, and a license managing unit 315 that decrements the number of licenses by one when the license for the application has been granted to the MFP and increments the number of licenses by one when the license for the application granted to the MFP has been canceled.

15 Claims, 16 Drawing Sheets

FIG. 4A

| PRODUCT KEY | PRODUCT ID | LICENSE |
|---|---|---|
| RP_552_891_578 | CopyPkg | 1 |

FIG. 4B

| LOCK CODE |
|---|
| XXX |
| XXX |
| ⋮ |

FIG. 4C

| HISTORICAL ID LIST |
|---|
| XXX |
| XXX |
| ⋮ |

| PRODUCT KEY | PACKAGE | LOCK CODE | LICENSE | HISTORICAL ID LIST |
|---|---|---|---|---|
| RP_552_891_578 | CopyPkg | – | 1 | – |

| PRODUCT KEY | PACKAGE | LOCK CODE | LICENSE | HISTORICAL ID LIST |
|---|---|---|---|---|
| RP_552_891_578 | CopyPkg | A 1234-1534 | 0 | - |

| PRODUCT KEY | PACKAGE | LICENSE | LOCK CODE | HISTORICAL ID LIST |
|---|---|---|---|---|
| RP_552_891_578 | CopyPkg | 1 | – | – |

| PRODUCT KEY | PACKAGE | LICENSE | LOCK CODE | HISTORICAL ID LIST |
|---|---|---|---|---|
| RP_552_891_578 | CopyPkg | 1 | – | A 1234-1534 |

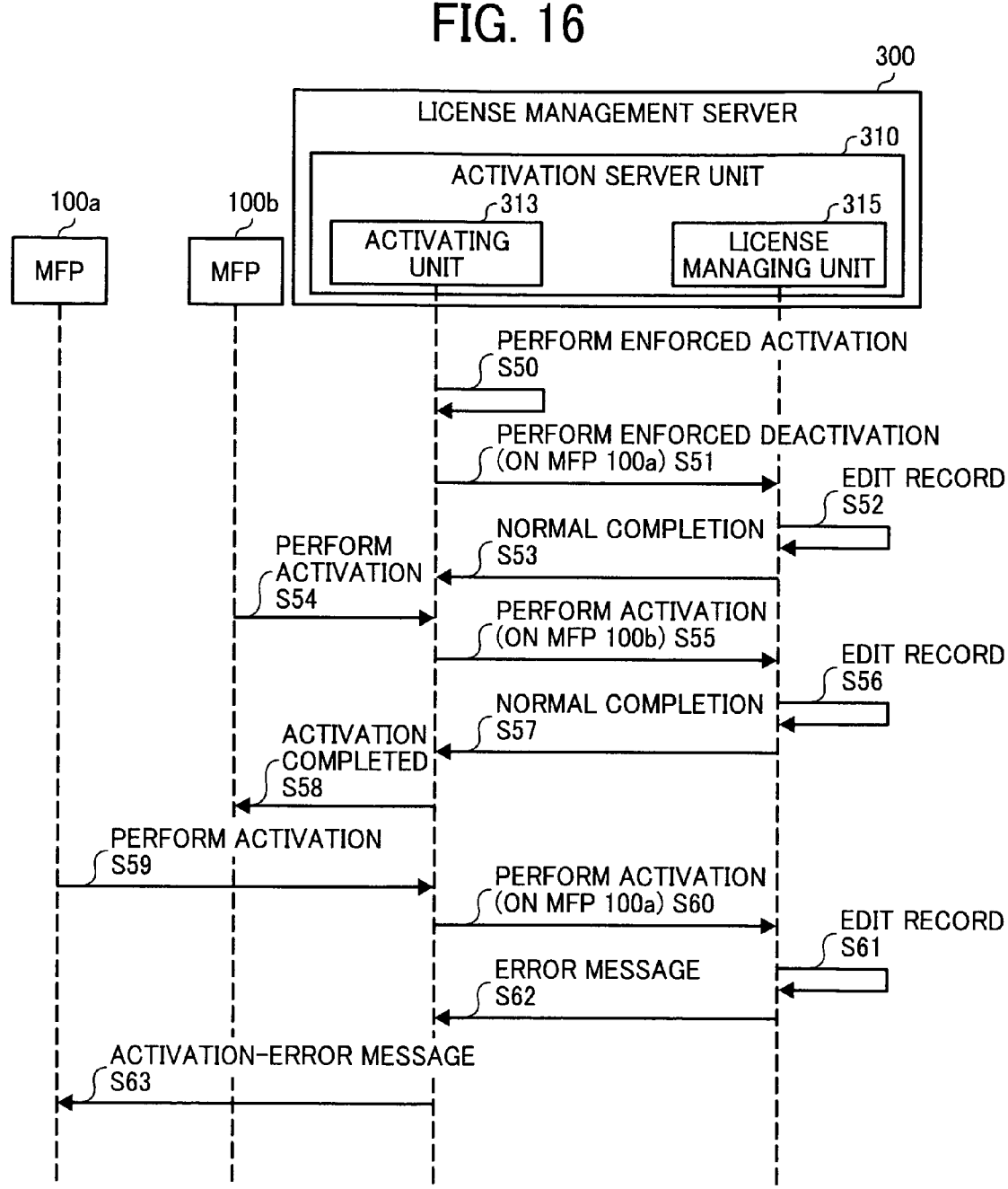

| PRODUCT KEY | PACKAGE | LICENSE | LOCK CODE | HISTORICAL ID LIST |
|---|---|---|---|---|
| RP_552_891_578 | CopyPkg | 0 | B 2431-1345 | – |

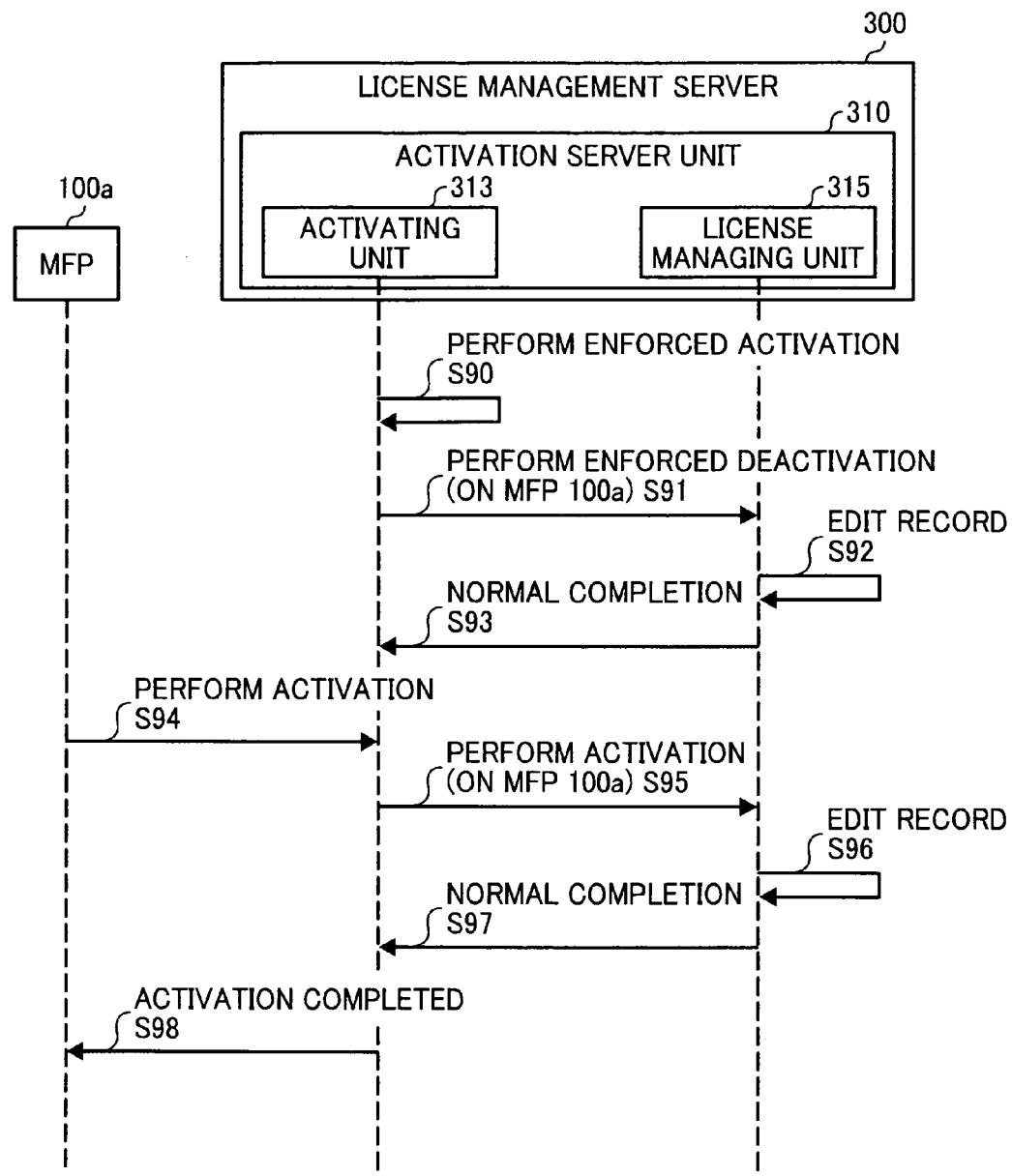

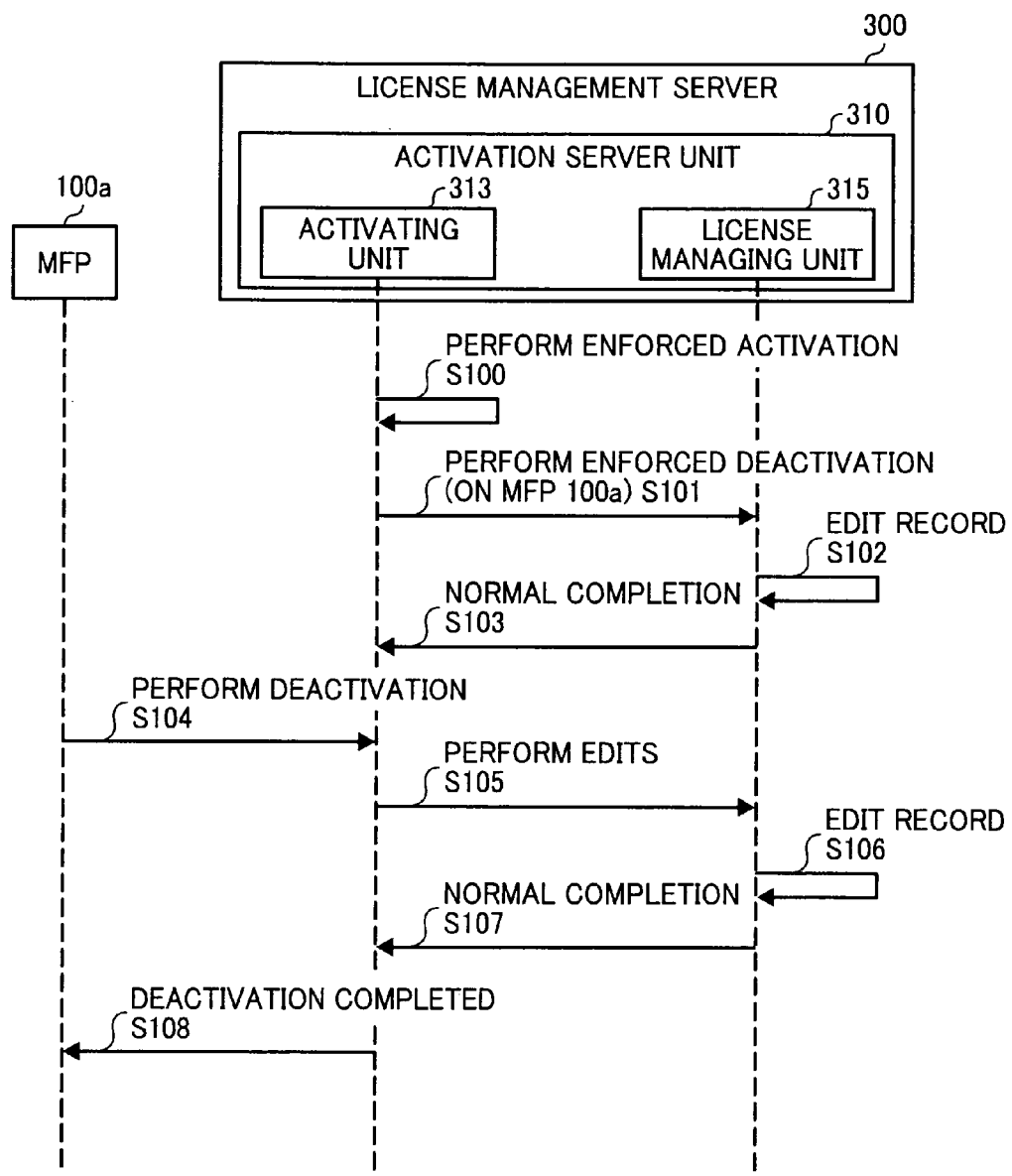

LICENSE MANAGEMENT SERVER, LICENSE MANAGEMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2009-206301 filed in Japan on Sep. 7, 2009.

BACKGROUND OF THE INVENTION

1. Field of the Invention

The present invention relates generally to license management server that manages installation of software onto image processing apparatus based on license-related status, license management method, and computer program product.

2. Description of the Related Art

Multifunction peripherals (MFPs), onto which program software developed after the MFP has been delivered to a customer is additionally installable, have been proliferated in recent years. To additionally install software onto such an MFP, it is necessary to obtain a license from an activation server and to activate the software.

However, there can be cases where an MFP, on which software has been activated, falls into a trouble, such as a failure, that prevents the MFP from canceling the activation (hereinafter, "deactivating") by the MFP itself. In such a case, the server performs enforced deactivation on the MFP in some cases.

A technique that allows flexible license management even when a license management server is in a trouble, e.g., a situation that the license management server is down, is disclosed in Japanese Patent Application Laid-open No. 2007-249804, for example. The technique disclosed in Japanese Patent Application Laid-open No. 2007-249804 includes a method of, in a case where one client apparatus is unable to carrying out communications with the server, the one client apparatus sends a request to another client apparatus to borrow a license therefrom so that a series of license management operations can be continued even while the license management server is down.

A technique that allows, even when a license has expired while a user is working with a licensed application, the user to continue working with the application without restarting the application is disclosed in, for instance, Japanese Patent Application Laid-open No. 2006-40262. The technique disclosed in Japanese Patent Application Laid-open No. 2006-40262 includes a method of managing a license by causing a platform that executes an application, which is managed by using the license, to send a notification that the license has been updated when the license has been updated.

However, even when the license is validated by using the techniques disclosed in Japanese Patent Application Laid-open No. 2007-249804 or Japanese Patent Application Laid-open No. 2006-40262, if enforced deactivation is performed by the server, the status of the MFP can go out of synchronization with that of the server. Mismatching between the status of the MFP and the status of the server is disadvantageous in that, in a case where the MFP has recovered from a failure, an attempt of license synchronization (activation/deactivation) between the MFP and the server can result in error due to the mismatching.

When such a technique as disclosed in Japanese Patent Application Laid-open No. 2007-249804 that allows one client apparatus to borrow a license from another client apparatus is employed, it is difficult to prevent unauthorized use of equipment.

SUMMARY OF THE INVENTION

It is an object of the present invention to at least partially solve the problems in the conventional technology.

According to an aspect of the present invention, there is provided a license management server connected to an image processing apparatus, the license management server including a storage unit that stores license identification information, by which a license for use in licensing the image processing apparatus to use an application is identified, the license identification information being associated with number of available licenses in the storage unit, a receiving unit that receives, from the image processing apparatus, any one of an activation request that the license for the application be granted to the image processing apparatus and a deactivation request that the license for the application granted to the image processing apparatus be canceled, a determining unit that accesses the storage unit upon receiving the activation request and determines that the license for the application is to be granted to the image processing apparatus when the number of licenses associated with the license identification information in the storage unit is equal to one or greater, an activating unit that grants the license for the application to the image processing apparatus if the determining unit has determined that the license for the application is to be granted to the image processing apparatus, whereas the activating unit cancels the license for the application granted to the image processing apparatus upon receiving the deactivation request, and an editing unit that decrements the number of licenses by one when the application has been granted to be used by the image processing apparatus, whereas the editing unit increments the number of licenses by one when the license for the application granted to the image processing apparatus has been canceled.

According to another aspect of the present invention, there is provided a license management method, the license management method including storing license identification information, by which a license for use in licensing an image processing apparatus to use an application is identified, the license identification information being associated with number of available licenses in the storage unit, receiving, from the image processing apparatus, any one of an activation request that the license for the application be granted to the image processing apparatus and a deactivation request that the license for the application granted to the image processing apparatus be canceled, determining, by accessing the storage unit upon receiving the activation request, that the license for the application is to be granted to the image processing apparatus when the number of licenses associated with the license identification information in the storage unit is equal to one or greater, activating such that the license for the application is granted to the image processing apparatus if the license is determined to be granted to the image processing apparatus, whereas the license for the application granted to the image processing apparatus is canceled upon receiving the deactivation request, and editing such that the number of licenses is decremented by one when the application has been granted to be used by the image processing apparatus, whereas the number of licenses is incremented by one when the license for the application granted to the image processing apparatus has been cancelled.

According to another aspect of the present invention, there is provided a computer program product comprising a computer-readable medium including program instructions, wherein the program instructions, when executed by a computer that includes a storage unit that stores license identification information, by which a license for use in licensing an image processing apparatus to use an application is identified, the license identification information being associated with number of available licenses in the storage unit, the program instructions causing the computer to perform, receiving, from the image processing apparatus, any one of an activation request that the license for the application be granted to the image processing apparatus and a deactivation request that the license for the application granted to the image processing apparatus be canceled, determining, by accessing the storage unit upon receiving the activation request, that the license for the application is to be granted to the image processing apparatus when the number of licenses associated with the license identification information in the storage unit is equal to one or greater, activating such that the license for the application is granted to the image processing apparatus if the license is determined to be granted to the image processing apparatus, whereas the license for the application granted to the image processing apparatus is canceled upon receiving the deactivation request, and editing such that the number of licenses is decremented by one when the application has been granted to be used by the image processing apparatus, whereas the number of licenses is incremented by one when the license for the application granted to the image processing apparatus has been cancelled.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4A is a diagram illustrating an example record stored in a license management DB 316;

FIG. 4B is a diagram illustrating an example lock code;

FIG. 4C is a diagram illustrating an example historical ID list;

FIG. 16 is a sequence diagram illustrating operations to be performed in a situation that, after enforced deactivation has been performed on one of the MFPs 100, or specifically MFP 100a, another one of the MFPs 100, or specifically MFP 100b, has issued an activation request and the MFP 100a has issued a re-activation request;

FIG. 17 is a diagram illustrating an example record edited by the license managing unit 315 during an activation process performed on the MFP 100b;

FIG. 18 is a sequence diagram illustrating a procedure for a deactivation process performed on the forcefully-deactivated MFP 100a;

FIG. 19 is a diagram illustrating an example record edited by the license managing unit 315;

FIG. 20 is a sequence diagram illustrating a procedure for an activation process performed upon receiving a re-activation request from the forcefully-deactivated MFP 100a;

FIG. 21 is a diagram illustrating an example record edited by the license managing unit 315 during the re-activation process performed on the forcefully-deactivated MFP 100a;

FIG. 22 is a sequence diagram illustrating a procedure for a deactivation process performed upon receiving deactivation request from the forcefully-deactivated MFP 100a;

FIG. 23 is a diagram illustrating an example record edited by the license managing unit 315 upon receiving the deactivation request from the forcefully-deactivated MFP 100a.

DETAILED DESCRIPTION OF THE PREFERRED EMBODIMENTS

Exemplary embodiments of the present invention are described in detail below with reference to the accompanying drawings. In the embodiments described below, an image processing apparatus is embodied as a multifunction peripheral (MFP) that combines a plurality of functions, such as a copier function, a facsimile function, and a printer function, in one casing. However, the image processing apparatus is not limited to such an MFP, and the present invention can be applied to any image processing apparatus, such as a facsimile apparatus or a scanner apparatus, onto which application is installable.

Figure 1:
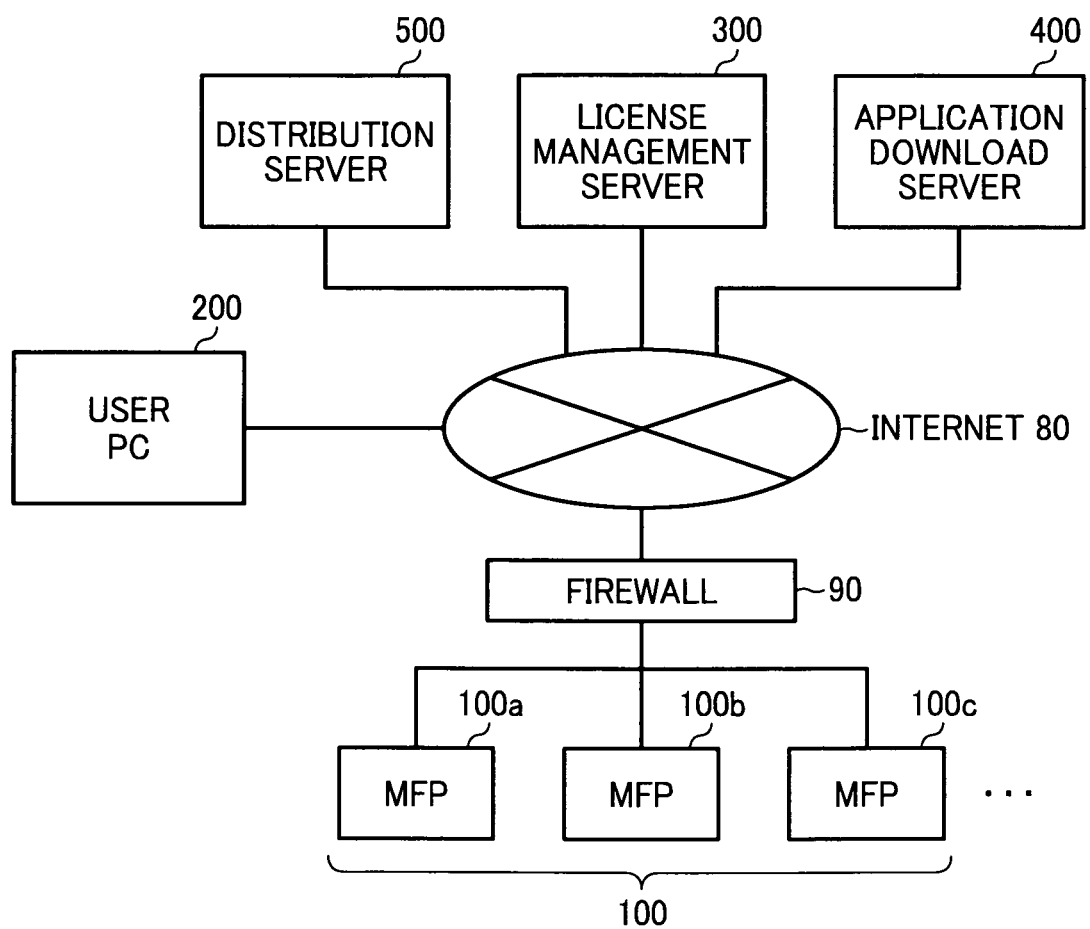
FIG. 1 is a block diagram schematically illustrating the configuration of a remote management system according to an embodiment of the present invention.

FIG. 1 is a block diagram schematically illustrating the configuration of a remote management system according to an embodiment of the present invention. As illustrated in FIG. 1, the remote management system includes a user personal computer (PC) 200, a license management server 300, an application download server 400, a distribution server 500, and a plurality of MFPs 100a, 100b, and 100c (hereinafter, "MFP 100" is used to denote a not-specified one of the MFPs)

that are connected to one another via a network 80, such as the Internet. A firewall 90 is provided between the MFP 100 and the network 80.

The firewall 90 monitors traffic passing across a boundary between the remote management system and the outside world, and detects and blocks unauthorized electronic access so as to prevent unauthorized operation performed by a third party that has intruded into the remote management system via an external network, such as the public line or the Internet.

The MFP 100 is an apparatus that has a plurality of functions to serve as a copier, a facsimile, a printer, and the like. The MFPs 100 are connected to one another via a local network, such as a local area network (LAN). Functional expansion or the like of the MFP 100 can be made by adding or updating a software component (hereinafter, simply referred to as "component") to or in the MFP 100. The remote management system of the embodiment includes the online three MFPs, or specifically the MFPs 100a, 100b, and 100c; however, the number of the MFPs is not limited to three, and the remote management system can include one, two, four, or more online MFPs.

The application download server 400 is an apparatus that manages entities of the components. More specifically, when a purchase request for a component has been issued by a user and the component has been licensed by the license management server 300, the application download server 400 provides the component to the MFP 100.

The license management server 300 is an apparatus that manages licenses (authorizations) of components each provided by the application download server 400 to be installed onto the MFP 100.

The distribution server 500 is an apparatus for use in carrying out procedures for purchase of a component to be added to the MFP 100 and the like. The distribution server 500 is provided on each of sales territories of the MFPs 100.

The distribution server 500 receives a component-purchase request via the user PC 200. The distribution server 500 is a server apparatus placed in a service center of the manufacturer, a service provider, or the like of the MFP 100. The distribution server 500 includes a management database for storing various types of management data.

The management database contains network configuration information and management information, such as customer information and technical information, about MFPs managed in customer sites on a customer-by-customer basis. The network configuration and management information, by which MFPs that are being managed and network configuration of the MFPs can be identified, includes various information about network configuration of each customer site and the number of MFPs connected to the network, and various information about each MFP, such as model, device number, delivery date, and location of the MFP, for instance. The customer information, by which a contact address of each customer, notably information about a contact address and the like of an equipment manager and a network administrator at the customer can be identified, includes name, address, telephone number, facsimile number, equipment manager's name, and a network administrator's name, for instance. The technical information, by which approximate cause of and remedy to a failure of a managed MFP can be identified, includes model, device number, count values, such as a print count and a scanner count, error codes, and probable causes, and indicates, for instance.

Each apparatus in the remote management system of the embodiment has a function of exchanging with another apparatus in the system a request for execution of a method with an application installed onto the other apparatus and a response thereto by using remote procedure call (RPC). The each apparatus is capable of utilizing protocols, such as simple object access protocol (SOAP), hyper text transfer protocol (HTTP), and file transfer protocol (FTP) to implement RPC.

The component is described in detail below. In the embodiment, the component is distributed in a unit to be called a distribution package. There are some cases where a plurality of distribution packages is set as the unit to be called a distribution package.

A single distribution package is configured to include a single distribution-package information file and an archive file (e.g., a JAR (Java (registered trademark) archive) file) that includes at least one functional package. The distribution-package information file contains information about attribute (distribution package information) of the distribution package. The distribution package information includes product ID, version, name, description, vendor name, and distribution type.

The product ID ds an identifier (product identifier) that is uniquely allocated to each of the distribution packages and the functional packages. The version is the version number of the distribution package. The description is description of the distribution package. The vendor name is the name of the vendor (or the developer) of the distribution package. The name is the name of the distribution package. The distribution type is information that indicates whether the distribution package requires activation (licensing). A distribution package that does not require activation can be used free of charge; however, the present embodiment will be described by way of an example distribution package that requires activation.

The functional package is a software package each containing a single functional unit. A single functional package is configured as an archive file that includes a single functional-package information file and a single component entity.

The functional-package information file contains information about attribute (functional package information) of the functional package. The functional package information includes product ID, version, name, description, vendor name, and distribution type.

The product ID is the product ID of the functional package. The version is the version number of the functional package. The name is the name of the functional package. The description is description of the functional package. The vendor name is the name of the vendor (or the developer) of the functional package. The distribution type is information that indicates whether the functional package requires activation.

Figure 2:
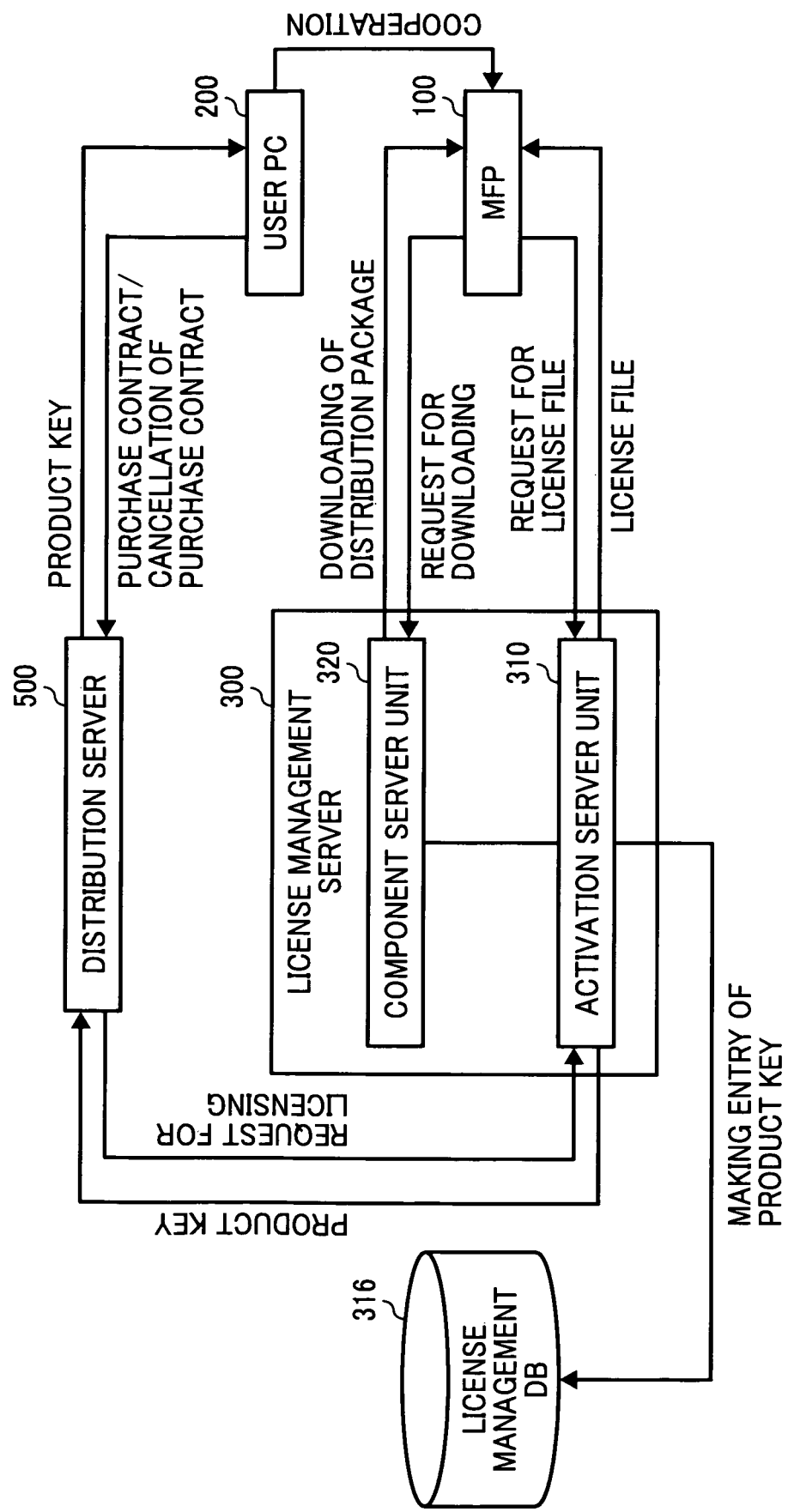
FIG. 2 is a block diagram schematically illustrating operations performed by a distribution server 500, a license management server 300, a user PC 200, and an MFP 100.

FIG. 2 is a block diagram schematically illustrating operations performed by the distribution server 500, the license management server 300, the user PC 200, and the MFP 100. As illustrated in FIG. 2, the user PC 200 carries out procedures for making and canceling component purchase contract with the distribution server 500. The distribution server 500 sends a request for licensing of a component specified by its product ID to an activation server unit 310 of the license management server 300. The activation server unit 310 of the license management server 300 creates a product key, enters the product key in a license management database (DB) 316, and transmits the product key to the distribution server 500. The distribution server 500 receives the product key and transmits the product key to the user PC 200.

Upon receiving the product key from the user PC 200, the MFP 100 sends a request for a license file to the activation server unit 310 of the license management server 300. The activation server unit 310 of the license management server 300 transmits a license file created by a component server unit 320 to the MFP 100.

Upon receiving the license file, the MFP 100 sends the license file and a request for downloading of a distribution package specified by its product ID to the component server unit 320 of the license management server 300. The component server unit 320 of the license management server 300 receives the license file, verifies the license file, and downloads the distribution package specified by the product ID to the MFP 100.

Figure 3:
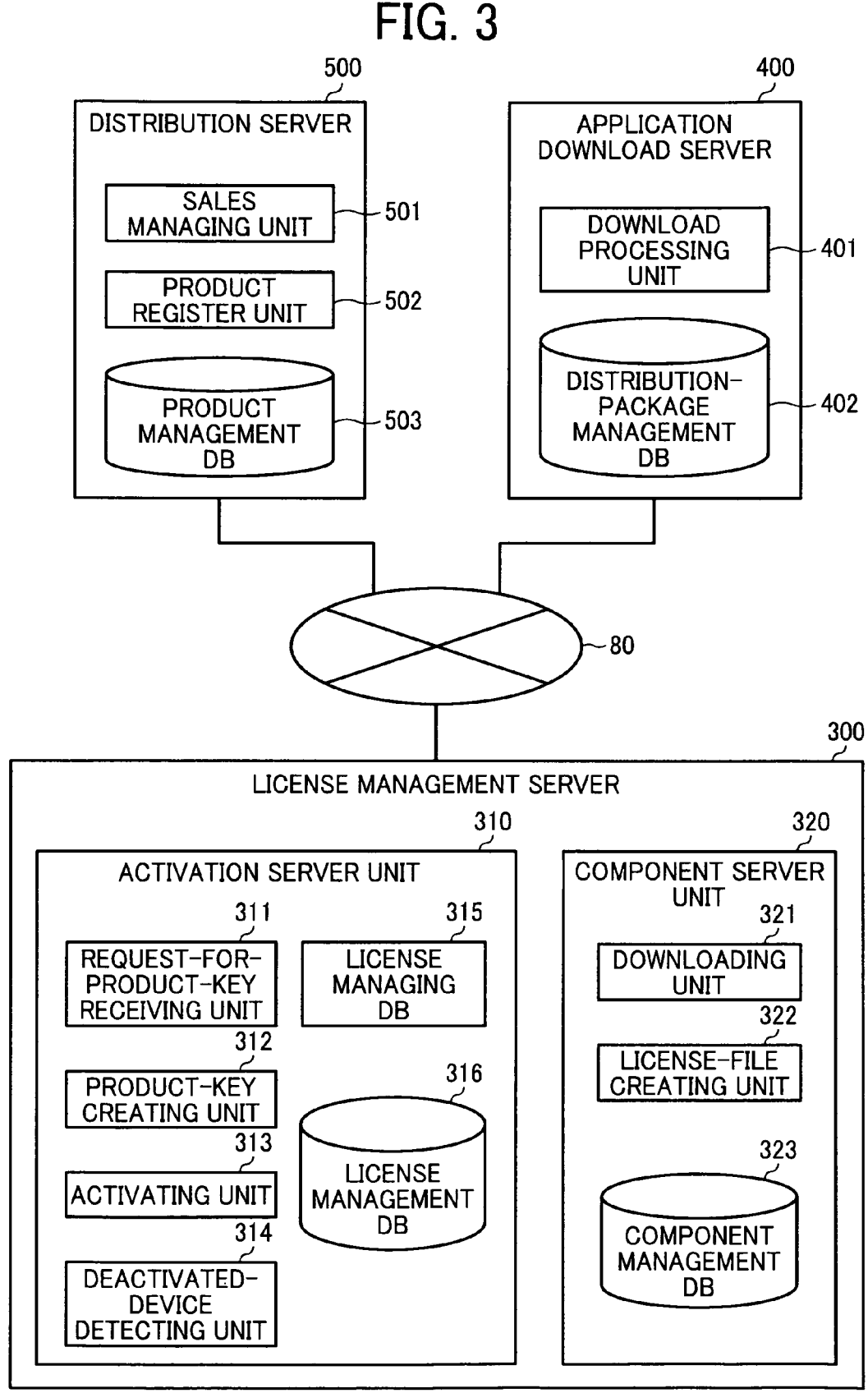
FIG. 3 is a block diagram illustrating an example functional configuration of a server system according to the embodiment.

FIG. 3 is a block diagram illustrating an example functional configuration of the distribution server 500, the application download server 400, and the license management server 300 according to the embodiment. The distribution server 500 is a portal site for product distribution. The distribution server 500 essentially includes a sales managing unit 501, a product register unit 502, and a product management DB 503.

The sales managing unit 501 receives, from the user PC 200, a purchase request for a product about which product information is stored in the product management DB 503. The sales managing unit 501 causes the license management server 300 to issue a product key associated with the product ID, for which the purchase request has been issued, and sends the product key to the user PC 200 as a response to the purchase request.

The product register unit 502 downloads a list of distribution packages that are managed by the license management server 300 in a centralized manner and enters information about configuration and the like of products according to the list in the product management DB 503.

In the embodiment, the product is a concept that includes a distribution package, or a group of distribution packages, specified by a product ID and license information about license of the distribution package or the group. The license information is information about a license type, licensed period, the number of available licenses, and the like.

The product key is an identifier that is uniquely issued (or allocated) each time a product is purchased. Accordingly, the product key is used as information (license identifier) for identification of a license of a distribution package in the product or as information for authentication of an authorized product purchaser.

The license management server 300 includes the activation server unit 310 and the component server unit 320. The activation server unit 310 essentially includes a request-for-product-key receiving unit 311, a product-key creating unit 312, an activating unit 313, a deactivated-device detecting unit 314, a license managing unit 315, and the license management DB 316.

The license management DB 316 stores licenses of distribution packages. FIG. 4A is a diagram illustrating an example record stored in the license management DB 316. As illustrated in FIG. 4A, the license management DB 316 stores a record, in which a product key of a distribution package is associated with a product ID, by which the distribution package can be identified, and the number of licenses associated with the product key.

The license management DB 316 also stores, for each product key, a lock code that contains device IDs of the MFPs 100 that are currently using the product key. FIG. 4B is a diagram illustrating an example of the lock code. If a plurality of licenses are associated with a single product key, two or more MFPs of the MFPs 100 can use the application; in this case, the lock code contains a plurality of device IDs as illustrated in FIG. 4B.

The license management DB 316 also stores, for each product key, a historical ID list that contains device ID of the MFP 100 where the application has been forcefully deactivated (hereinafter, "forcefully-deactivated MFP 100") during use of the product key. Meanwhile, enforced deactivation denotes enforced deactivation performed by the server even when a deactivation request is not issued by the MFP 100. Examples of a situation where the enforced deactivation is performed include a situation where the license management server 300 performs enforced deactivation upon detection of a failure in the MFP 100.

FIG. 4C is a diagram illustrating an example of the historical ID list. Because the device ID remains stored in the historical ID list until a deactivation request is issued by the forcefully-deactivated MFP 100, if the number of the forcefully-deactivated MFPs 100 is two or greater, a plurality of device IDs are stored in the historical ID list even when the number of licenses is one as illustrated in FIG. 4C.

The request-for-product-key receiving unit 311 receives a request for a product key associated with a product ID of a target distribution package from the distribution server 500.

When the request for the product key has been received by the request-for-product-key receiving unit 311, the product-key creating unit 312 creates the product key associated with the product ID of the specified distribution package. When the product-key creating unit 312 has created the product key, the product-key creating unit 312 enters the product key in the license management DB 316 and transmits the same product key to the distribution server 500.

The deactivated-device detecting unit 314 detects a deactivation factor, which is a factor causing the MFP 100 where the application has been activated (hereinafter, "activated MFP 100") to be deactivated, and transmits an enforced deactivation request to the activating unit 313. Examples of the deactivation factor include failure of the MFP 100. The deactivated-device detecting unit 314 implements periodical polling of a status of the MFP 100, thereby detecting a failure of the MFP 100. The enforced deactivation request, which is a request for enforced deactivation, contains the product ID, the product key, and the device ID.

Upon receiving the activation request from the MFP 100, the activating unit 313 checks the number of licenses in the license management DB 316 and activates the distribution package specified by the activation request. The activation request, which is a request for licensing of the application, contains the product ID, the product key, and the device ID.

More specifically, the activating unit 313 receives from the MFP 100 the product ID and the product key together with the activation request and accesses the record in the license management DB 316, thereby checking the number of licenses associated with the received product key. If one or more licenses are associated with the product key in the license management DB 316, the activating unit 313 determines that activation is permitted, and activates the distribution package on the MFP 100 that has issued the activation request. The activating unit 313 corresponds to a determining unit in aspects of the present invention.

If no license is associated with the product key in the license management DB 316, the activating unit 313 transmits an error message stating that activation is not permitted to the MFP 100 that has issued the activation request. The activating unit 313 corresponds to an error notifying unit in an aspect of the present invention.

Upon receiving the deactivation request from the MFP 100, the activating unit 313 deactivates the distribution package specified by the deactivation request. The deactivation request, which is a request for canceling the license for the application granted to the MFP 100, contains the product ID, the product key, and the device ID.

More specifically, the activating unit 313 receives from the MFP 100 the product ID and the product key together with the deactivation request. The activating unit 313 deactivates the distribution package on the MFP 100 that has issued the deactivation request.

When the enforced deactivation request has been received by the deactivated-device detecting unit 314, the activating unit 313 deactivates the distribution package on the MFP 100 specified by the enforced deactivation request.

When activation has been performed on the MFP 100 by the activating unit 313, the license managing unit 315 performs edits by entering the device ID of the activated MFP 100 in the lock code stored in the license management DB 316 and decrementing the number of licenses by one.

When deactivation has beet performed on the MFP 100 by the activating unit 313, the license managing unit 315 deletes the device ID of the MFP 100 where the application has been deactivated (hereinafter, "deactivated MFP 100") from the lock code in the license management DB 316 and increments the number of licenses by one.

The component server unit 320 essentially includes a downloading unit 321, a license-file creating unit 322, and a component management DB 323.

The downloading unit 321 downloads the distribution package transmitted from the application download server 400 and stored in the component management DB 323 to the MFP 100.

The component management DB 323 receives the distribution package from the application download server 400 and stores the distribution package.

The license-file creating unit 322 receives the product key from the user PC 200, determines whether the product key is valid by referring to the license management DB 316, and, if the product key is valid, creates a license file. Meanwhile, the license file is a file that contains license information about a distribution package licensed for installation onto the MFP 100. More specifically, the license-file creating unit 322 compares the received product key with product keys having already been created and stored in the license management DB 316 to determine whether there is a match, and determines that the received product key is valid when there is a match.

The application download server 400 essentially includes a download processing unit 401 and a distribution-package management DB 402.

The distribution-package management DB 402 stores distribution packages that are individually associated with product IDs, by each of which a corresponding one of the distribution packages can be identified.

The download processing unit 401 transfers the distribution package specified by the product ID in the download request transmitted from the MFP 100 to the component server unit 320 of the license management server 300 so that the distribution package is transmitted to the MFP 100 via the component server unit 320 of the license management server 300.

Figure 5:
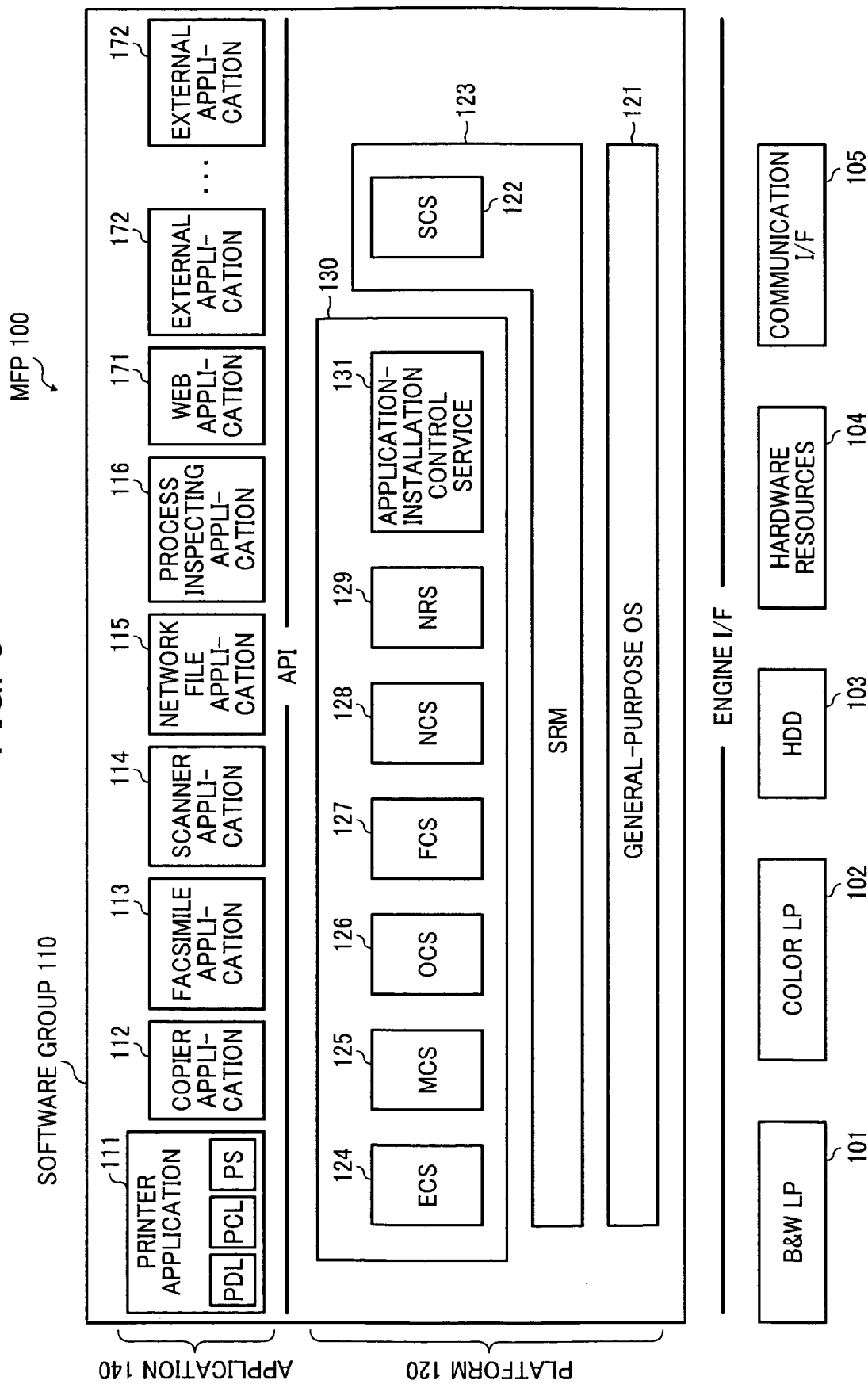
FIG. 5 is a schematic software configuration diagram of the MFP according to the embodiment.

The MFP 100 will be described below. FIG. 5 is a schematic software configuration diagram of the MFP according to the embodiment. As illustrated in FIG. 5, the MFP 100 includes a black-and-white laser printer (B&W LP) 101, a color laser printer (color LP) 102, a hard disk drive (HDD) 103, hardware resources 104, such as a scanner, a facsimile, and memory, a communication I/F 105, and a software group 110 that includes a platform 120 and an application 140.

The HDD 103 of the MFP 100 according to the embodiment stores application, license data pertaining to the application, and the device ID, which is unique identification of the MFP 100.

The platform 120 includes control service 130 that interprets a request from the application and issues a resource request for a hardware resource, a system resource manager (SRM) 123 that manages one or more hardware resources and arbitrates resource requests from the control service, and a general-purpose operating system (OS) 121.

The control service includes a plurality of service modules, or specifically a system control service (SCS) 122, an engine control service (ECS) 124, a memory control service (MCS) 125, an operation panel control service (OCS) 126, a facsimile control service (FCS) 127, a network control service (NCS) 128, a new remote service (NRS) 129, and an application-installation control service 131. The platform 120 includes an application program interface (API) that allows receipt of a processing request from the application 140 by using functions defined in advance.

The general-purpose OS 121, which is a general-purpose operating system such as UNIX (registered trademark), executes software programs of the platform 120 and the application 140 concurrently as parallel processes.

The SRM 123 processes system control and resource management in cooperation with the SCS 122. More specifically, the SRM 123 performs arbitration, execution, and control according to a request from an upper layer that uses hardware resource of an engine, such as a scanner unit and a printer unit, memory, an HDD file, and a host input/output (I/O) (e.g., a Centronics I/F, a network I/F, an IEEE 1394 (the Institute of Electrical and Electronics Engineers 1394) I/F, or an RS-232C I/F).

More specifically, the SRM 123 determines whether the requested hardware resource is available (i.e., whether the requested hardware resource is currently in use for another request), and if the requested hardware resource is available, sends a notification that the requested hardware resource is available to the upper layer. In response to a request from the upper layer, the SRM 123 also arranges a schedule for utilization of the hardware resource, and directly performs a requested operation (e.g., memory allocation, file creation, or causing a printer engine to perform paper feeding and image forming).

The SCS 122 processes application management, control of an operating unit, displaying system-related screens, indication with light-emitting diodes (LEDs), resource management, control of application interruption, and the like.

The ECS 124 processes engine control of the hardware resources 104 that include the B&W LP 101, the color LP 102, the scanner, and the facsimile.

The MCS 125 processes allocation and release of image memory, utilization of the HDD, compression and decompression of image data, and the like.

The FCS 127 provides an API that allows facsimile transmission to and reception from each application layer of a system controller by using a public switched telephone network (PSTN) or integrated services digital network (ISDN) network, storing and retrieving facsimile data in and from a backup SRAM (BKM) that manages various facsimile data pieces, scanning for facsimile transmission, printing of received facsimile data, and transmission and reception by using combined functions.

The NCS 128 processes provision of services that are common among applications that require network I/O, or more specifically intermediates allocation of data pieces, which are received via the network by using various protocols, to the applications and data transmission from the applications to the network.

The OCS 126 processes control of an operation panel (control panel) that serves as an interface between an operator (user) and control of the apparatus. When a key is pressed (or touched) on the operation panel, the OCS 126 recognizes it as a key event. The OCS 126 includes a portion serving as an OCS process that transmits a key event function corresponding to the thus-recognized key to the SCS 122 and a portion serving as an OCS library, in which display functions that cause the operation panel to display various screens according to a request from the application 130 or the control service, other control functions for the operation panel, and the like are stored in advance. The OCS library is implemented as being linked with various modules of the application 130 and the control service. The entire OCS 126 can be configured so as to operate as OCS processes. Alternatively, the entire OCS 126 can be configured as the OCS library.

The application-installation control service 131 that controls installation of application onto the MFP 100 will be described in detail below.

Figure 6:
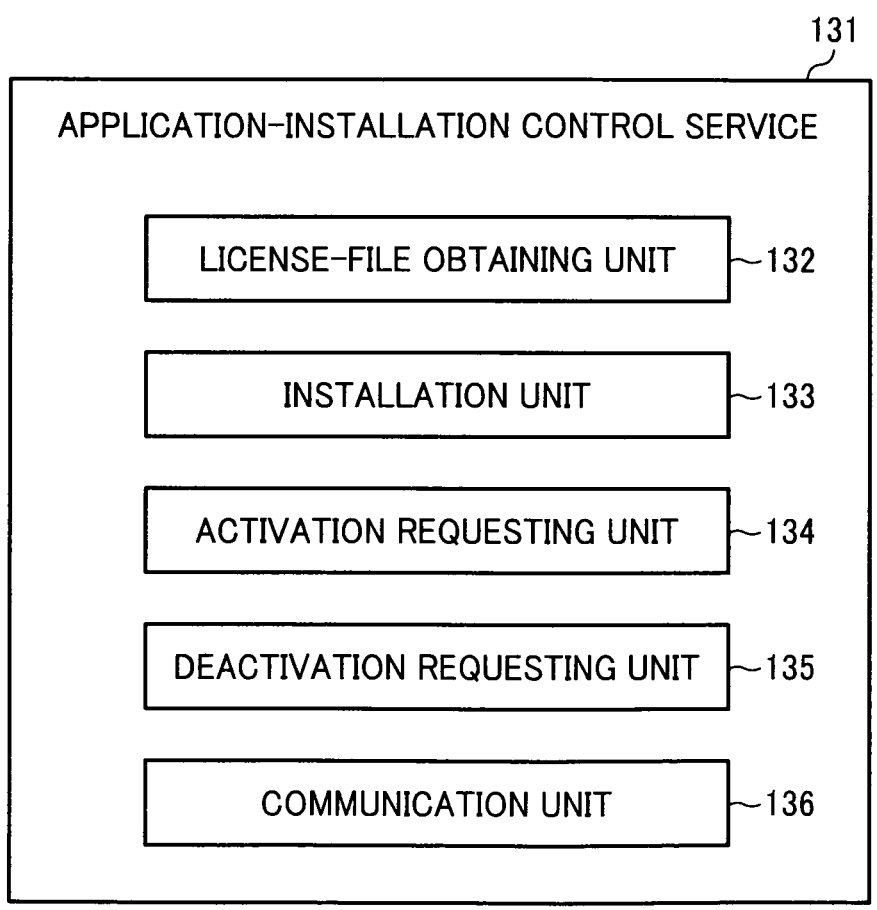
FIG. 6 is an explanatory diagram of functions related to application-installation control service.

FIG. 6 is an explanatory diagram of functions related to the application-installation control service. As illustrated in FIG. 6, the application-installation control service 131 essentially includes a license-file obtaining unit 132, an installation unit 133, an activation requesting unit 134, a deactivation requesting unit 135, and a communication unit 136.

The license-file obtaining unit 132 receives a license file from the activation server unit 310 of the license management server 300.

The installation unit 133 installs an application contained in a distribution package downloaded from the application download server 400 or the component server unit 320 of the license management server 300 onto the MFP 100.

The activation requesting unit 134 transmits an activation request to the activation server unit 310 of the license management server 300 via the communication unit 136.

The deactivation requesting unit 135 transmits a deactivation request to the activation server unit 310 of the license management server 300 via the communication unit 136.

The communication unit 136 carries out communications with the distribution server 500, the license management server 300, the application download server 400, and the user PC 200 to exchange data.

Figures 7, 8:
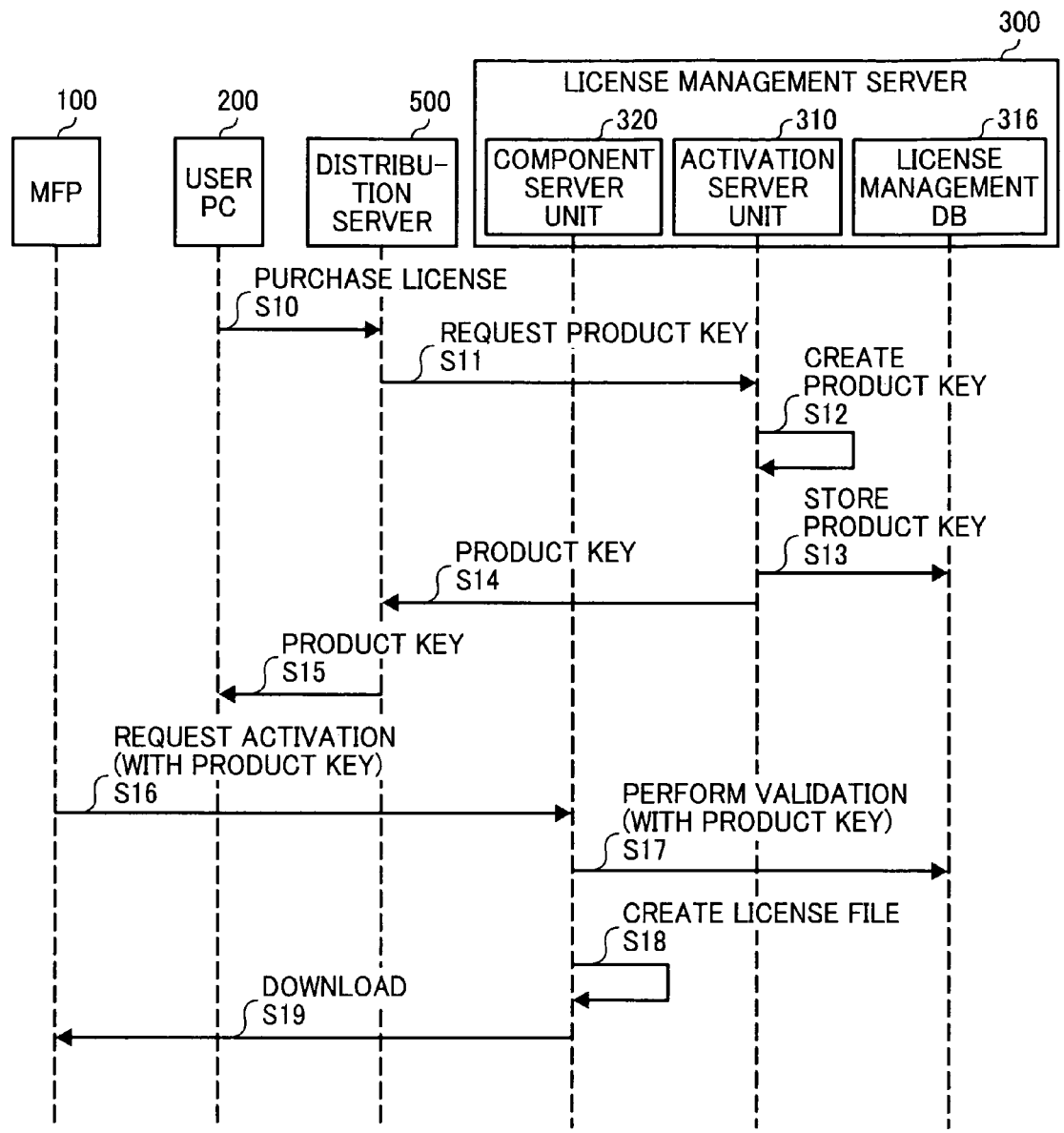
FIG. 7 is a sequence diagram illustrating a procedure for a license purchase process performed in the remote management system.
FIG. 8 is a diagram illustrating an example record in the license management DB 316.

A procedure for a license purchase process will be described below. FIG. 7 is a sequence diagram illustrating the procedure for the license purchase process in the remote management system. Upon receiving entries about predetermined items, such as a product ID of a distribution package and the number of would-be-purchased licenses, from a user, the user PC 200 transmits the received entries to the distribution server 500 as a license purchase request (Step S10).

Upon receiving the product ID from the user PC 200, the distribution server 500 transmits, to the activation server unit 310 of the license management server 300, a request for the product key associated with the product ID received from the user PC 200 (Step S11). More specifically, the sales managing unit 501 of the distribution server 500 transmits the product ID received from the user PC 200 to the activation server unit 310 of the license management server 300.

The product-key creating unit 312 of the activation server unit 310 of the license management server 300 receives the product ID from the request-for-product-key receiving unit 311 of the activation server unit 310 of the license management server 300, and creates a product key associated with the product ID (Step S12). The product-key creating unit 312 of the activation server unit 310 of the license management server 300 stores the product key in the license management DB 316 (Step S13), and transmits the same product key to the distribution server 500 (Step S14).

FIG. 8 is a diagram illustrating an example record in the license management DB 316. As illustrated in FIG. 8, the product-key creating unit 312 enters the record that contains the product key "RP 552 891 578" created for the product ID in the received request for the product key and that is associated with package information "CopyPkg" and the number of purchased licenses "1" in the license management DB 316.

The distribution server 500 receives the product key from the product-key creating unit 312 of the activation server unit 310 of the license management server 300 and transmits the product key to the user PC 200 (Step S15). The MFP 100 receives the product key from the user PC 200 and transmits an activation request that contains the product key and the device ID of the MFP 100 to the component server unit 320 of the license management server 300 (Step S16).

The license-file creating unit 322 of the component server unit 320 of the license management server 300 looks up the received product key in the license management DB 316 to determine validity of the product key (Step S17). More specifically, the license-file creating unit 322 determines whether the license management DB 316 contains the received product key.

If the received product key is determined to be valid, the license-file creating unit 322 of the component server unit 320 of the license management server 300 creates a license file (Step S18).

The downloading unit 321 of the component server unit 320 of the license management server 300 transmits the distribution package obtained from the application download server 400 together with the created license file to the MFP 100 (Step S19).

Figure 9:
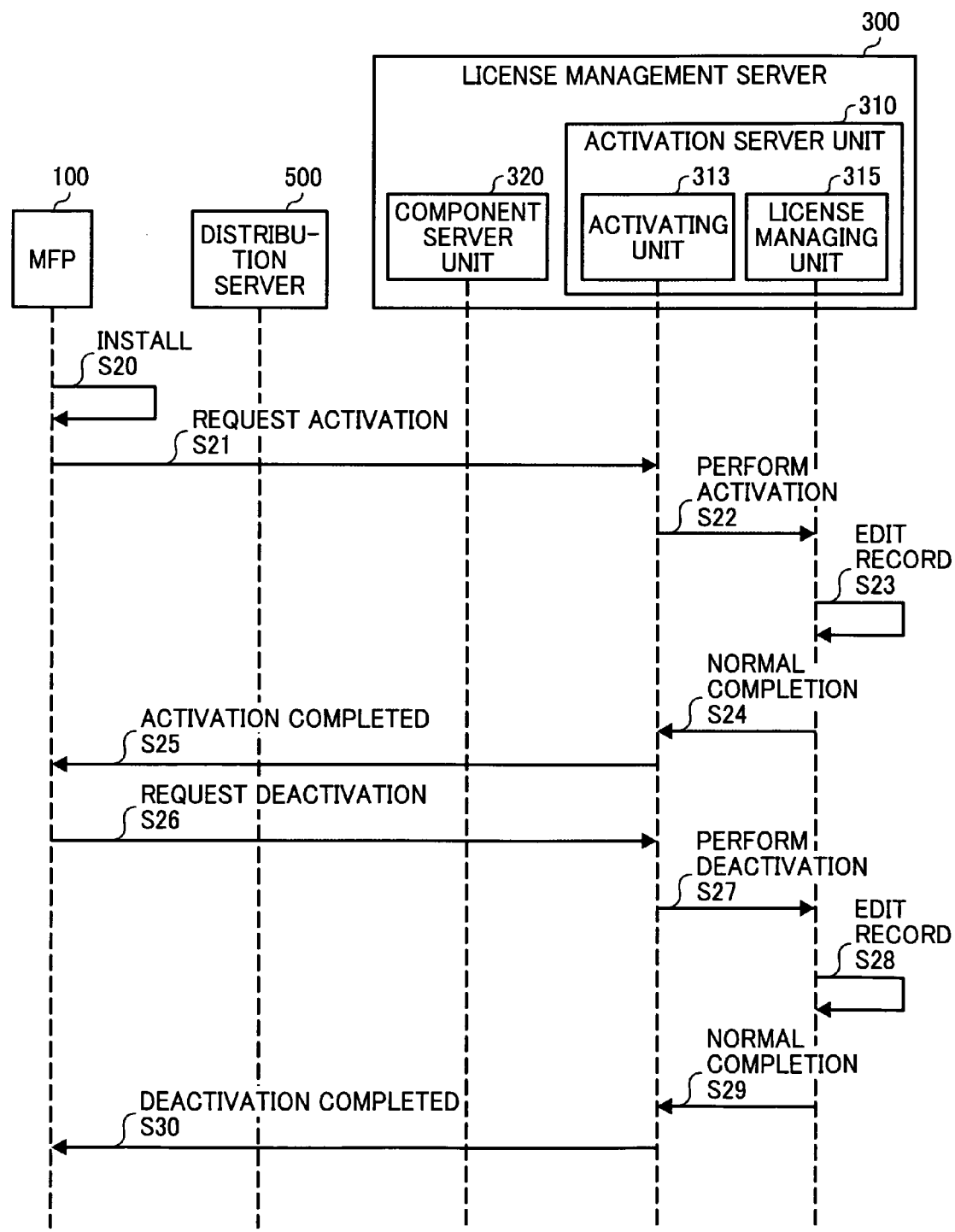
FIG. 9 is a sequence diagram illustrating a procedure for an activation process performed in the remote management system.

An activation process to be performed in the remote management system will be described below. FIG. 9 is a sequence diagram illustrating a procedure for the activation process performed in the remote management system. The installation unit 133 of the MFP 100 obtains the distribution package from the component server unit 320 of the license management server 300 through the license purchase process and performs installation of the distribution package (Step S20).

The activation requesting unit 134 of the MFP 100 transmits the product key and the device ID together with the activation request to the license management server 300 (Step S21).

Upon receiving the activation request, the activating unit 313 of the activation server unit 310 of the license management server 300 refers to the license management DB 316 to determine whether activation is authorized, and if the activation is authorized, transmits an instruction to edit a corresponding record to the license managing unit 315 of the activation server unit 310 of the license management server 300 (Step S22). More specifically, the activating unit 313 refers to the corresponding record in the license management DB 316 to determine whether one or more licenses are associated with the product key received from the MFP 100 in the record, and if it is determined that one or more licenses are associated with the product key in the record, the activating unit 313 performs activation.

Upon receiving the instruction for activation, the license managing unit 315 of the activation server unit 310 of the license management server 300 edits the record stored in the license management DB 316 (Step S23).

Figures 10, 11:
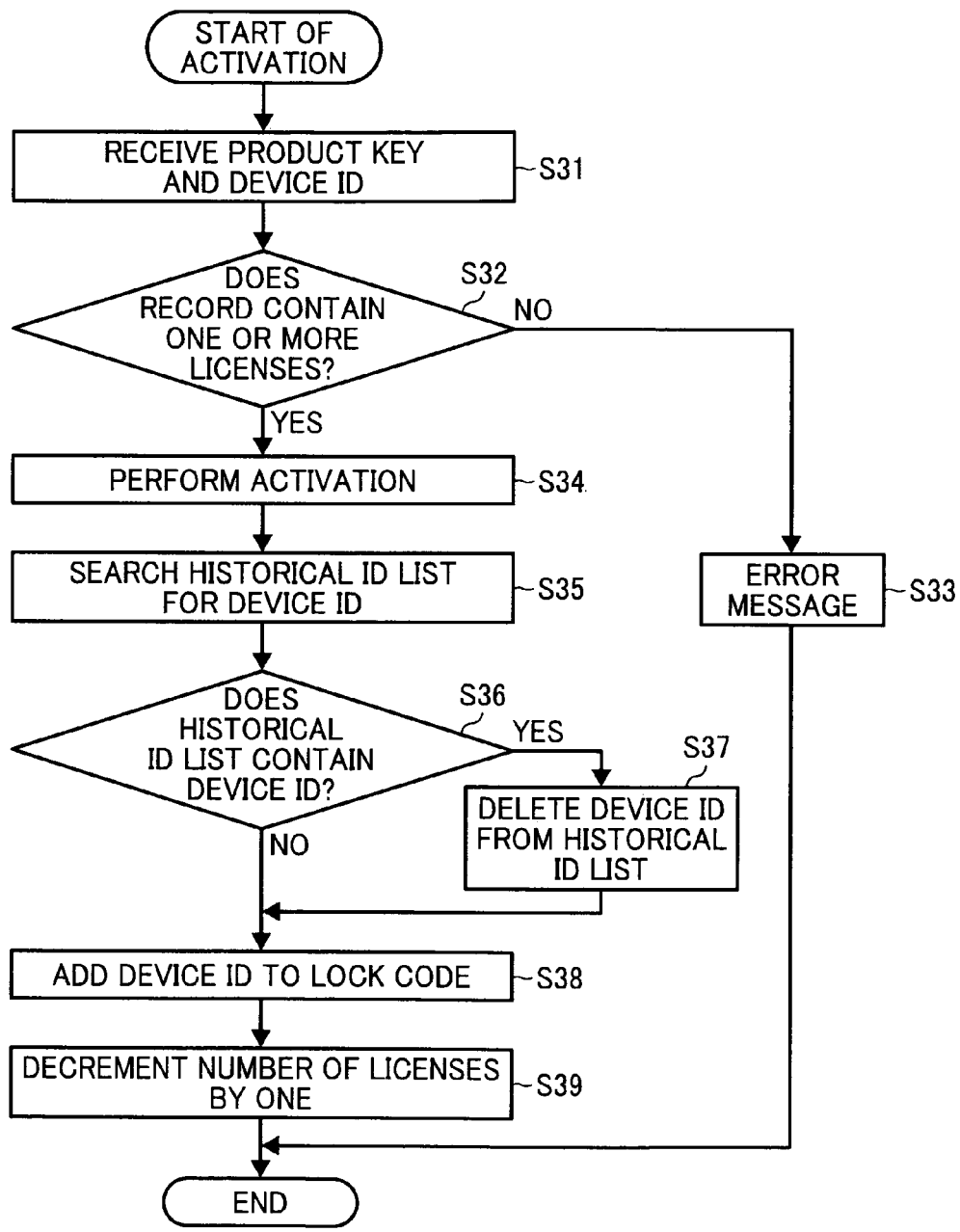
FIG. 10 is a flowchart of a procedure for a record-editing process to be performed by a license managing unit 315 during the activation process.
FIG. 11 is a diagram illustrating an example record edited by the license managing unit 315 during the activation process.

The record-editing process to be performed at Step S23 will be described in detail below. FIG. 10 is a flowchart illustrating the procedure for performing the record-editing process.

The license management server 300 receives the product key and the device ID (Step S31) and determines whether the record contains one or more licenses associated with the received product key (Step S32).

If it is determined that the record contains one or more licenses associated with the product key (Yes at Step S32), the license management server 300 activates the license for the product key involved with the activation request issued by the MFP 100 (Step S34).

In contrast, if it is determined that the record contains no license associated with the product key (No at Step S32), the license management server 300 transmits an error message to the MFP 100 (Step S33).

The license management server 300 searches the historical ID list for the device ID of the activated MFP 100 (Step S35). If the historical ID list contains the device ID (Yes at Step S36), the license management server 300 deletes the device ID from the historical ID list (Step S37). Meanwhile, the historical ID list contains the device ID in such a situation that the currently-handled activation request is a re-activation request issued by the forcefully-deactivated MFP 100.

After having deleted the device ID from the historical ID list (Step S37), the license management server 300 adds the device ID to the lock code (Step S38). If the search results in determination that the historical ID list does not contain the device ID (No at Step S36), the license management server 300 adds the device ID to the lock code but does not edit the historical ID list (Step S38). Meanwhile, the historical ID list does not contain the device ID in such a situation that the currently-handled activation request is a normal activation request.

After having added the device ID to the lock code (Step S38), the license management server 300 decrements the number of licenses in the record by one (Step S39).

FIG. 11 is a diagram illustrating an example record edited by the license managing unit 315 during the activation process. As illustrated in FIG. 11, the license managing unit 315 edits the record by decrementing the number of licenses associated with the product key "RP 552 891 578" by one, or more specifically from "1," which is the number, of licenses in the record at the time of license purchase illustrated in FIG. 8, to "0."

Returning to Step S24 in the sequence diagram illustrated in FIG. 9, upon completion of the record-editing process, the license managing unit 315 of the activation server unit 310 of the license management server 300 transmits a message about normal completion of the editing process to the activating unit 313 of the activation server unit 310 of the license management server 300 (Step S24).

Upon receiving the message about completion of the record-editing process, the license management server 300 transmits a message about completion of activation to the MFP 100 (Step S25).

The MFP 100 transmits a deactivation request to the license management server 300 (Step S26). More specifically, the MFP 100 transmits the deactivation request that contains the product ID and the product key associated with the distribution package involved with the deactivation request to the license management server 300 via the communication unit 136.

Upon, receiving the deactivation request, the license management server 300 refers to the license management. DB 316 for verification, performs deactivation, and transmits an instruction to edit a corresponding record to the license managing unit 315 (Step S27).

Upon receiving the instruction for deactivation, the license management server 300 edits the record stored in the license management DB 316 (Step S28).

Figures 12, 13:
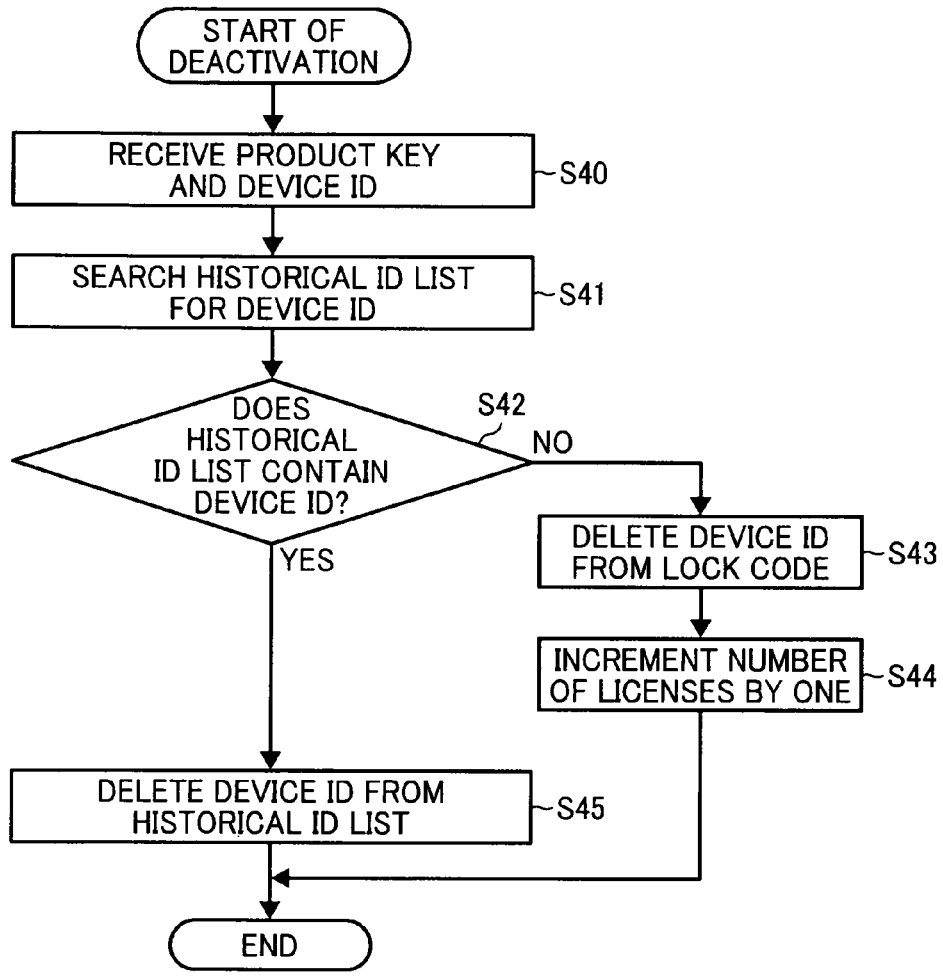
FIG. 12 is a flowchart of a procedure for a record-editing process to be performed by the license managing unit 315 during a deactivation process.
FIG. 13 is a diagram illustrating an example record edited by the license managing unit 315 during the deactivation process.

The record-editing process to be performed by the license managing unit 315 during the deactivation process will be described in detail below. FIG. 12 is a flowchart of a procedure for the record-editing process to be performed by the license managing unit 315 during the deactivation process.

The license management server 300 receives the product key and the device ID (Step S40). The license managing unit 315 searches the historical ID list for the received device ID (Step S41). If it is found that the historical ID list contains the device. ID (Yes at Step S42), the license managing unit 315 performs edits of deleting the device ID from the historical ID list (Step S45).

If it is found that the historical ID list does not contain the device ID (No at Step S42), the license managing unit 315 performs edits of deleting the device ID from the lock code (Step S43) and incrementing the number of licenses by one (Step S44).

FIG. 13 is a diagram illustrating an example record edited by the license managing unit 315 during the deactivation process. As illustrated in FIG. 13, the license managing unit 315 edits the record by incrementing the number of licenses associated with the product key "RP 552 891 578" by one, or more specifically from "0," which is the number of licenses after the activation process illustrated in FIG. 11, to "1."

Upon completion of the record-editing process, the license managing unit 315 of the activation server unit 310 of the license management server 300 transmits a message about normal completion of the editing process to the activating unit 313 of the activation server unit 310 of the license management server 300 (Step S29).

Upon receiving the message about completion of the record-editing process, the activating unit 313 of the activation server unit 310 of the license management server 300 transmits a message about completion of deactivation to the MFP 100 (Step S30).

Figures 14, 15:
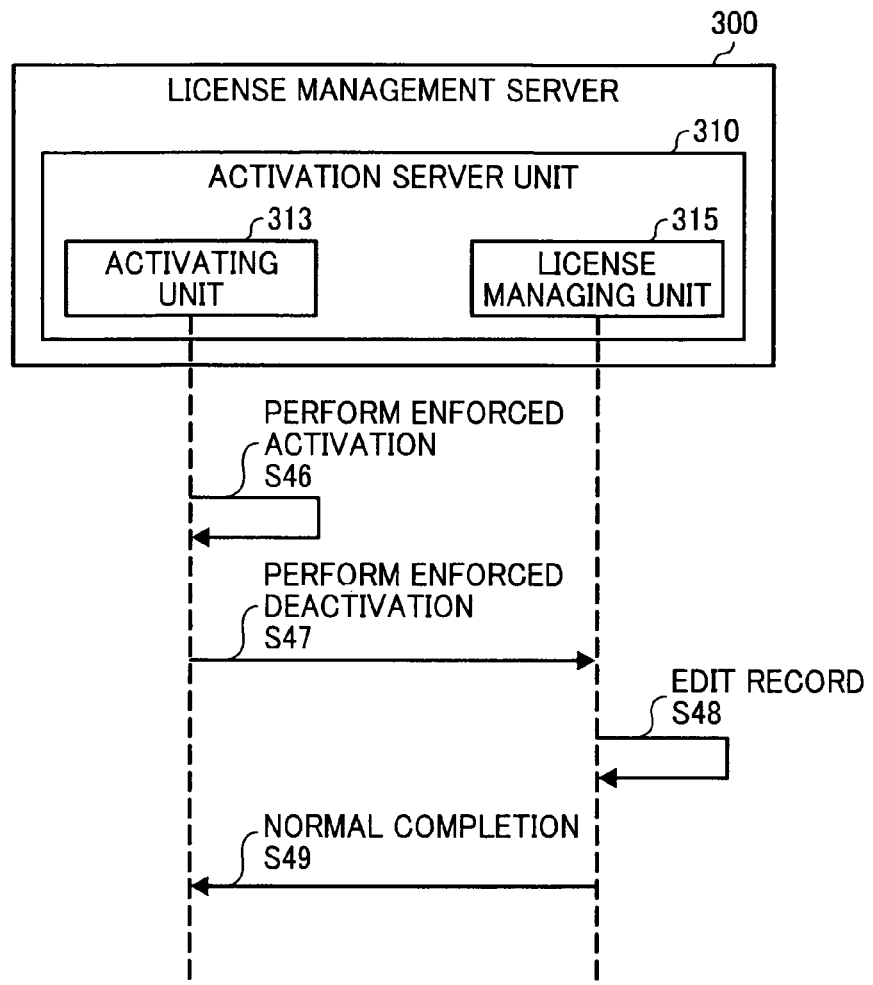
FIG. 14 is a sequence diagram illustrating a procedure for an enforced deactivation process.
FIG. 15 is a diagram illustrating an example record edited by the license managing unit 315 during the enforced deactivation process.

An enforced deactivation, process performed by the license management server 300 to forcefully deactivate the application on the MFP 100 will be described below. FIG. 14 is a sequence diagram illustrating a procedure for the enforced deactivation process.

In such a situation that a failure is detected in the MFP 100, the activating unit 313 of the activation server unit 310 of the license management server 300 performs enforced deactivation, which is deactivation forcefully performed on the MFP 100 by the license management server 300 (Step S46).

The activating unit 313 of the activation server unit 310 of the license management server 300 transmits an instruction to edit a record involved in the enforced deactivation to the license managing unit 315 of the activation server unit 310 of the license management server 300 (Step S47). The license managing unit 315 of the activation server unit 310 of the license management server 300 edits the record (Step S48). More specifically, the license managing unit 315 enters the device ID of the MFP 100, on which the enforced deactivation is performed, in the historical ID list, deletes the device ID of the MFP 100 from the lock code, and increments the number of licenses by one.

FIG. 15 is a diagram illustrating an example record edited by the license managing unit 315 during the enforced deactivation process. As illustrated in FIG. 15, the license managing unit 315 edits the record by deleting the device ID from the lock code associated with the product key "RP 552 891 578," enters the device ID of the MFP 100 in the historical ID list, and increments the number of licenses by one, or more specifically from "0," which is the number of licenses after the activation process illustrated in FIG. 11, to "1."

Returning to Step S49 in the sequence diagram illustrated in FIG. 14, upon completion of the record-editing process, the license managing unit 315 of the activation server unit 310 of the license management server 300 transmits a message about normal completion of the editing process to the activating unit 313 of the activation server unit 310 of the license management server 300 (Step S49).

Operations to be performed in a situation that, after enforced deactivation has been performed on the MFP 100*a*, another one of the MFPs 100, or specifically the MFP 100*b*, has issued an activation request and the MFP 100*a* has issued a re-activation request will be described. FIG. 16 is a sequence diagram illustrating the operations to be performed in a situation that, after enforced deactivation has been performed on the MFP 100*a*, the MFP 100*b* has issued an activation request and the MFP 100*a* has issued a re-activation request.

The activating unit 313 of the activation server unit 310 of the license management server 300 performs enforced deactivation on the activated MFP 100*a* (Step S50) and transmits an instruction to edit a corresponding record to the license managing unit 315 of the activation server unit 310 of the license management server 300 (Step S51). Upon receiving the instruction for enforced deactivation, the license managing unit 315 of the activation server unit 310 of the license management server 300 edits the record stored in the license management DB 316 of the activation server unit 310 of the license management server 300 (Step S52). The record in the license management DB 316 is edited as in the case of the record in the license management DB 316 illustrated in FIG. 15.

Upon completion of the record-editing process (Step S52), the license managing unit 315 of the activation server unit 310 of the license management server 300 transmits a message about normal completion of the record-editing process to the activating unit 313 of the activation server unit 310 of the license management server 300 (Step S53).

The activation requesting unit 134 of the MFP 100*b* transmits an activation request to the activating unit 313 of the activation server unit 310 of the license management server 300 (Step S54). The MFP 100*b* transmits the product key and the device ID together with the activation request.

Upon receiving the activation request together with the product key and the device ID from the MFP 100*b*, the activating unit 313 of the activation server unit 310 of the license management server 300 refers to the license management DB 316 to check the number of licenses, performs activation on the MFP 100*b*, and transmits an instruction to edit a corresponding record to the license managing unit 315 of the activation server unit 310 of the license management server 300 (Step S55). Because the license management DB 316 currently contains the record illustrated in FIG. 15, in which the number of licenses is one, the activation is authorized.

Upon receiving the instruction to edit the record, the license managing unit 315 of the activation server unit 310 of the license management server 300 edits the record (Step S56). More specifically, the license managing unit 315 enters the device ID of the MFP 100*b* in the lock code in the record and decrements the number of licenses by one.

FIG. 17 is a diagram illustrating an example record edited by the license managing unit 315 during the activation process performed on the MFP 100*b*. As illustrated in FIG. 17, the license managing unit 315 edits the record by entering the device ID of the MFP 100*b* in the lock code associated with the product key "RP 552 891 578" and decrementing the number of licenses by one, or more specifically from "1," which is the number of licenses after the enforced deactivation process has been performed on the MFP 100*a* illustrated in FIG. 15, to "0."

Returning to Step S56, upon completion of the record-editing process (Step S56), the license managing unit 315 of the activation server unit 310 of the license management server 300 transmits a message about normal completion of the record-editing process to the activating unit 313 of the activation server unit 310 of the license management server 300 (Step S57).

The activating unit 313 of the activation server unit 310 of the license management server 300 transmits a message about normal completion of activation to the MFP 100*b* (Step S58).

The forcefully-deactivated MFP 100*a* then transmits a re-activation request to the activating unit 313 of the activation server unit 310 of the license management server 300 (Step S59). The activating unit 313 of the activation server unit 310 of the license management server 300 refers to the license management DB 316 to check the number of licenses. Because the number of license is zero as illustrated in FIG. 17, the activating unit 313 determines that no further activation is authorized.

Because the activation process is not performed, the license managing unit 315 of the activation server unit 310 of the license management server 300 does not edit the record (Step S61) and returns an error message to the activating unit 313 of the activation server unit 310 of the license management server 300 (Step S62).

The activating unit 313 of the activation server unit 310 of the license management server 300 transmits an activation-error message stating that the activation is unauthorized to the MFP 100*a* (Step S63).

As described above, if the MFP 100*a* has issued a re-activation request in the situation that, after an application has been activated with a product key and then forcefully deactivated on the MFP 100*a*, the another one of the MFPs 100, or specifically the MFP 100*b*, has issued an activation request with the same product key, the number of licenses in the record is zero. This is because the license associated with the product key has already been occupied by the MFP 100*b*. Hence, overlapped use of the product key is prevented.

Figures 18, 19:
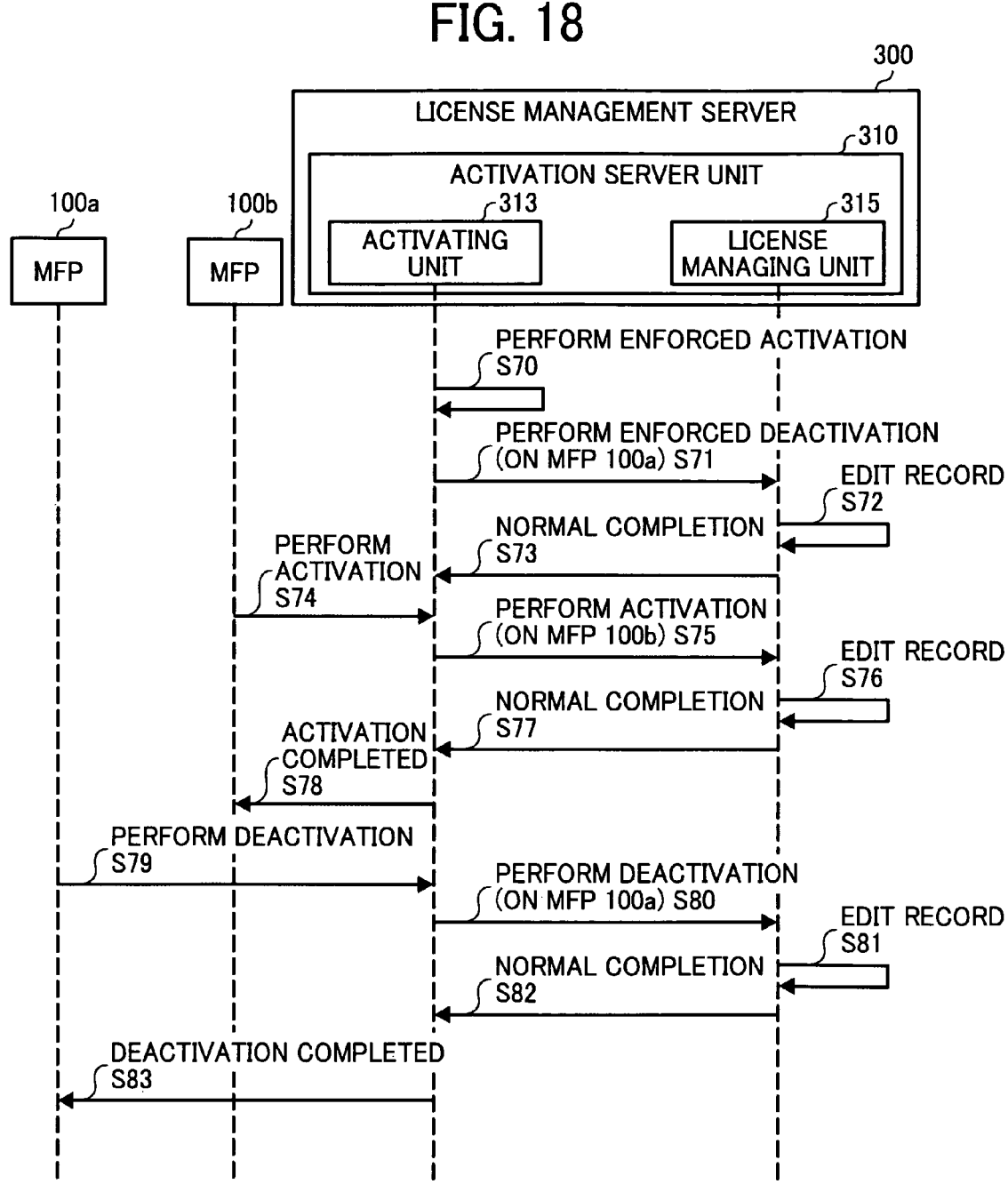

Operations to be performed in a situation that, after an application has been activated with a product key and then forcefully deactivated on the MFP 100*a*, the another MFP 100*b* has issued an activation request with the same product key and the MFP 100*a* has issued a deactivation request with the same product key will be described. FIG. 18 is a sequence diagram illustrating a procedure for a deactivation process to be performed on the forcefully-deactivated MFP 100*a*.

Because operations to be performed from Step S70 to Step S78 of FIG. 18 are similar to those from Step S50 to Step S58 of the sequence diagram for the activation process illustrated in FIG. 16, repeated descriptions are omitted.

The deactivation requesting unit 135 of the MFP 100*a* transmits a deactivation request to the activating unit 313 of the activation server unit 310 of the license management server 300 (Step S79). More specifically, the deactivation requesting unit 135 of the MFP 100*a* transmits the product key and the device ID together with the deactivation request.

Upon receiving the deactivation request from the MFP 100*a*, the activating unit 313 of the activation server unit 310 of the license management server 300 performs deactivation on the MFP 100*a* and transmits an instruction to edit a corresponding record to the license managing unit 315 of the activation server unit 310 of the license management server 300 (Step S80).

The license managing unit 315 of the activation server unit 310 of the license management server 300 deletes the device ID of the MFP 100a from the historical ID list in the record in the license management DB 316 (Step S81). Meanwhile, the license managing unit 315 does not change the number of licenses because the device ID has already been deleted from the lock code and the number of licenses has been incremented by one when the license management server 300 has performed enforced deactivation on the MFP 100 that is specified by the device ID.

FIG. 19 is a diagram illustrating an example record edited by the license managing unit 315. As illustrated in FIG. 19, the license managing unit 315 has performed edits of deleting the device ID of the MFP 100a from the historical ID list edited by the license managing unit 315 in the record illustrated in FIG. 17.

Returning to Step S82, the license managing unit 315 of the activation server unit 310 of the license management server 300 transmits a message about normal completion of the record-editing process to the activating unit 313 of the activation server unit 310 of the license management server 300 (Step S82). The activating unit 313 of the activation server unit 310 of the license management server 300 transmits a message about completion of deactivation to the MFP 100a (Step S83).

As described above, the license management server 300 is configured to increment the number of licenses by one upon receiving a deactivation request, but not to increment the number of licenses when it is determined based on the historical ID list that the deactivation request is issued by the forcefully-deactivated MFP 100. This allows synchronization of the number of licenses. This is also advantageous in that when a user who does not know that enforced deactivation has been performed on the MFP 100 and the number of license has already been incremented by one, has made an input to transmit a deactivation request to the MFP 100, because the device ID of the MFP 100 has already been contained in the historical ID list, the license management server 300 can transmit a message about completion of deactivation without changing the number of licenses.

Operations to be performed when a re-activation request is issued by the forcefully-deactivated MFP 100a will be described below. FIG. 20 is a sequence diagram illustrating a procedure for an activation process performed upon receiving the re-activation request from the forcefully-deactivated MFP 100a.

Because operations to be performed from Step S90 to Step S93 of FIG. 20 are similar to those from Step S50 to Step S53 of the sequence diagram for the activation process illustrated in FIG. 16, repeated descriptions are omitted.

The activation requesting unit 134 of the MFP 100a transmits an activation request to the activating unit 313 of the activation server unit 310 of the license management server 300 (Step S94). More specifically, the activation requesting unit 134 of the MFP 100a transmits the product key and the device ID together with the activation request.

The activating unit 313 of the activation server unit 310 of the license management server 300 refers to the record in the license management DB 316 illustrated in FIG. 15 to check the number of licenses. If the number of licenses in the record is equal to or greater one, the license management server 300 performs activation on the MFP 100a (Step S95).

The activating unit 313 of the activation server unit 310 of the license management server 300 transmits an instruction to edit the record to the license managing unit 315 of the activation server unit 310 of the license management server 300 (Step S95).

The activating unit 313 of the activation server unit 310 of the license management server 300 accesses the record, illustrated in FIG. 15, which has been edited during the enforced deactivation process performed on the MFP 100a, to find that the historical ID list contains the device ID of the MFP 100a. The license managing unit 315 of the activation server unit 310 of the license management server 300 then deletes the device ID of the MFP 100a from the historical ID list and enters the device ID of the MFP 100a in the lock code. Because the device ID of the MFP 100a has thus been added to the lock code, the license managing unit 315 of the activation server unit 310 of the license management server 300 decrements the number of licenses by one (Step S96).

FIG. 21 is a diagram illustrating an example record edited by the license managing unit 315 during the re-activation process performed on the forcefully-deactivated MFP 100a. As illustrated in FIG. 21, the license managing unit 315 of the activation server unit 310 of the license management server 300 edits the record, illustrated in FIG. 15, on which edits have been performed during the enforced deactivation process performed on the MFP 100a, by adding the device ID of the MFP 100a to the lock code and deleting the device ID of the MFP 100a from the historical ID list.

The license managing unit 315 of the activation server unit 310 of the license management server 300 transmits a message about normal completion of the record-editing process to the activating unit 313 of the activation server unit 310 of the license management server 300 (Step S97). The activating unit 313 of the activation server unit 310 of the license management server 300 transmits a message about completion of the activation process to the MFP 100a (Step S98).

As described above, if an activation request is issued from the forcefully-deactivated MFP 100a and the activation is performed, the device ID of the MFP 100a is deleted from the historical ID list. This allows the license management server 300 to be notified of the status of the MFP 100a where the application has been re-activated through normal activation.

Operations to be performed when a deactivation request is issued by the forcefully-deactivated MFP 100a will be described below. FIG. 22 is a sequence diagram illustrating a procedure for a deactivation process performed upon receiving the deactivation request issued by the forcefully-deactivated MFP 100a.

Because operations to be performed from Step S100 to Step S103 of FIG. 20 are similar to those from Step S50 to Step S53 of the sequence diagram for the activation process illustrated in FIG. 16, repeated descriptions are omitted.

The deactivation requesting unit 135 of the MFP 100a transmits a deactivation request to the activating unit 313 of the activation server unit 310 of the license management server 300 (Step S104). More specifically, the deactivation requesting unit 135 of the MFP 100a transmits the product key and the device ID together with the deactivation request.

The activating unit 313 of the activation server unit 310 of the license management server 300 accesses the historical ID list where the record contains the device ID of the MFP 100a to find that the application has already been deactivated on the MFP 100a. The activating unit 313 of the activation server unit 310 of the license management server 300 transmits an instruction to perform edits to the license managing unit 315 of the activation server unit 310 of the license management server 300 but does not perform the deactivation process (Step S105).

The license managing unit 315 of the activation server unit 310 of the license management server 300 edits the record (Step S106). More specifically, the license managing unit 315 searches the historical ID list, illustrated in FIG. 15, which has been edited during the enforced deactivation process performed on the MFP 100a, for the device ID of the MFP 100a and finds that the record in the list contains the device ID of the MFP 100a. Accordingly, the license managing unit 315 deletes the device ID of the MFP 100a from the historical ID list.

FIG. 23 is a diagram illustrating an example record edited by the license managing unit 315 upon receiving the deactivation request from the forcefully-deactivated MFP 100a. As illustrated in FIG. 23, the license managing unit 315 of the activation server unit 310 of the license management server 300 edits the record, illustrated in FIG. 15, on which edits have been performed during the enforced deactivation process performed on the MFP 100a, by deleting the device ID of the MFP 100a from the historical ID list.

Returning to Step S107, upon completion of the record-editing process, the license managing unit 315 of the activation server unit 310 of the license management server 300 transmits a message about normal completion of the record-editing process to the activating unit 313 of the activation server unit 310 of the license management server 300 (Step S107).

The activating unit 313 of the activation server unit 310 of the license management server 300 transmits a message about completion of deactivation to the MFP 100a (Step S108).

As described above, according to the embodiment, managing the lock code and the historical ID list in the license management DB 316 makes it possible to grant a single license to a single MFP, thereby preventing unauthorized use of the license.

Figure 24:
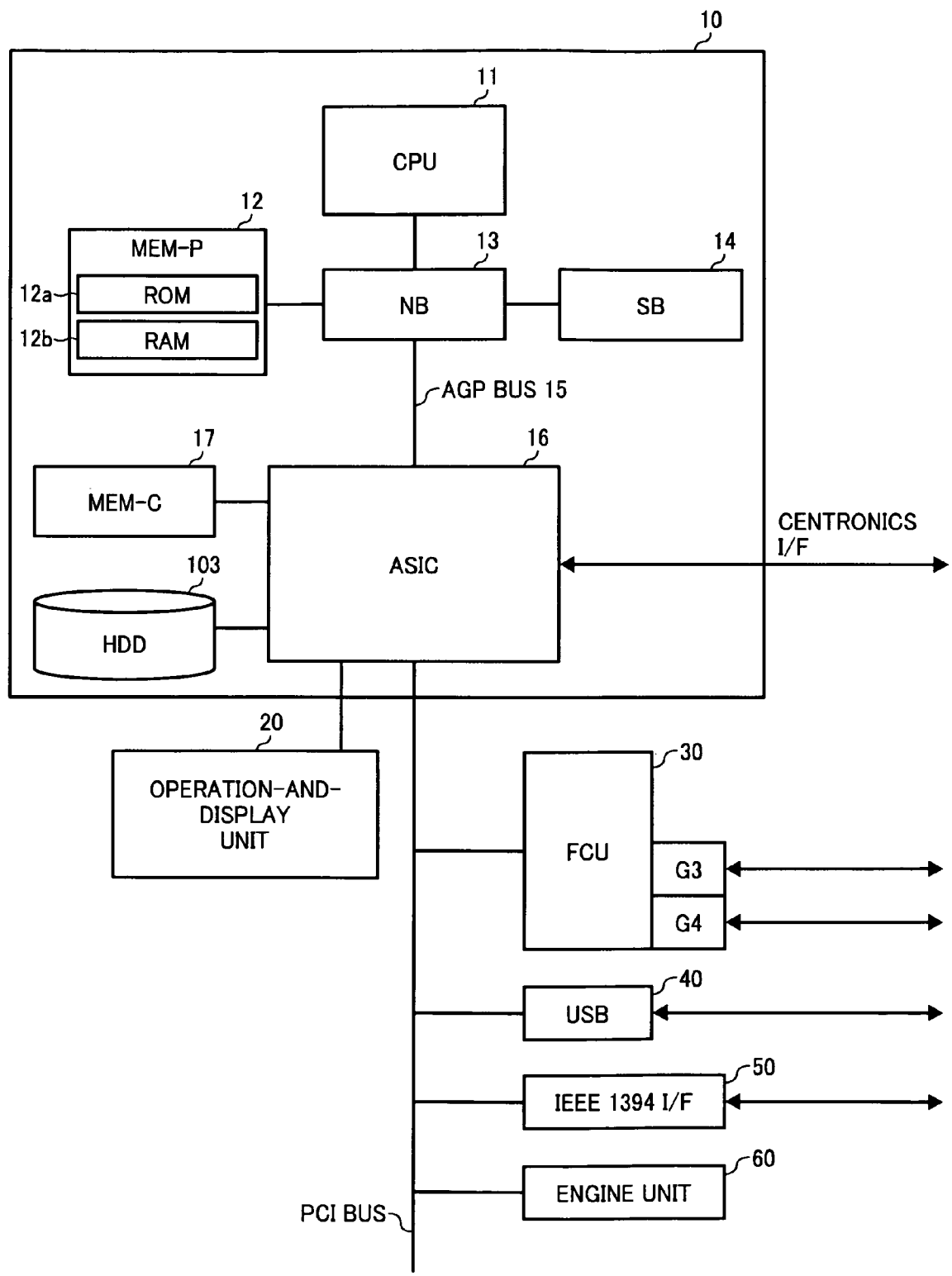
FIG. 24 is a block diagram of a hardware configuration of the MFP according to the embodiment.

FIG. 24 is a block diagram illustrating a hardware configuration of the MFP according to the embodiment. As illustrated in FIG. 24, the MFP 100 includes a controller 10 and an engine unit 60 that are connected together with a peripheral component interface (PCI) bus. The controller 10 is a controller that controls the overall MFP 100, drawing processing, communication, and input entered via an operating unit (not shown). The engine unit 60 is the printer engine or the like that is connectable to the PCI bus. Examples of the engine unit 60 include a black-and-white plotter, a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 10 includes a central processing unit (CPU) 11, a north bridge (NB) 13, a system memory (hereinafter, "MEM-P") 12, a south bridge (SB) 14, a local memory (hereinafter, "MEM-C") 17, an application-specific integrated circuit (ASIC) 16, and an HDD 103, in which an accelerated graphics port (AGP) bus 15 connects between the NB 13 and the ASIC 16. The MEM-P 12 further includes a read only memory (ROM) 12a and a random access memory (RAM) 12b.

The CPU 11 that controls the overall MFP 100 includes a chip set that includes the NB 13, the MEM-P 12, and the SB 14. The CPU 11 is connected to another device via the chip set.

The NB 13 is a bridge for connecting the CPU 11 to the MEM-P 12, the SB 14, and the AGP bus 15. The NB 13 includes a PCI master, an AGP target, and a memory controller that controls reading and writing from and to the MEM-P 12 and the like.

The MEM-P 12 is a system memory for use as a memory for storing program instructions and data, a memory for loading program instructions and data thereinto, a memory for use in drawing processing performed by the printer, and the like, and includes the ROM 12a and the RAM 12b. The ROM 12a is a read only memory for use as a memory for storing program instructions and data. The RAM 12b is a writable and readable memory for use as a memory for loading program instructions and data thereinto, a memory for use in drawing processing performed by the printer, and the like.

The SB 14 is a bridge for connecting the NB 13 to a PCI device and peripheral devices. The SB 14 is connected to the NB 13 via the PCI bus, to which a network I/F and the like are also connected.

The ASIC 16, which is an integrated circuit (IC) for use in image processing, includes a hardware component for the image processing, and functions as a bridge that connects the AGP bus 15, the PCI bus, the HDD 103, and the MEM-C 17 with one another. The ASIC 16 includes a PCI target and an AGP master, an arbiter (ARB) serving as the core for the ASIC 16, a memory controller that controls the MEM-C 17, a plurality of direct memory access controllers (DMACs) that performs data processing related to rotation of an image and the like by hardware logic, and a PCI unit that performs data transfer to and from the engine unit 60 via the PCI bus. A facsimile control unit (FCU) 30, a universal serial bus (USB) 40, and an IEEE 1394 (the Institute of Electrical and Electronics Engineers 1394) I/F 50 are connected to the ASIC 16 via the PCI bus. An operation-and-display unit 20 is directly connected to the ASIC 16.

The MEM-C 17 is a local memory for use as a copy image buffer and a code buffer. The HDD 103 is a storage for storing image data, program instructions, font data, and forms.

The AGP bus 15 is a bus interface for a graphics accelerator card introduced to speed up graphics operations and allows direct access to the MEM-P 12 with a high throughput, thereby speeding up operations related to the graphic accelerator card.

According to an aspect of the present invention, even when an application is forcefully deactivated by a server, maintaining license synchronization properly and preventing unauthorized use of equipment are achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A license management server connected to a plurality of image processing apparatuses, the license management server comprising:
   a storage unit configured to store license identification information, by which a license for use in licensing one or more of the plurality of image processing apparatuses to use an application is identified, the license identification information being associated with a number of available licenses in the storage unit;
   a receiving unit configured to receive from the one or more of the plurality of image processing apparatuses, any one of an activation request that the license for the application be granted to the one or more of the plurality of image processing apparatuses and a deactivation request that the license for the application granted to the one or more image processing apparatuses be canceled;
   a determining unit configured to access the storage unit upon receiving the activation request and to determine that the license for the application is to be granted to the one or more of the plurality of image processing apparatuses upon the number of licenses associated with the license identification information in the storage unit being equal to one or greater;

an activating unit configured to, perform an activation to grant the license for the application to the one or more of the plurality of image processing apparatuses upon the determining unit determining that the license for the application is to be granted to the one or more of the plurality of image processing apparatuses perform a deactivation to cancel the license for the application granted to the one or more of the plurality of image processing apparatuses upon the receiving unit receiving the deactivation request from the one or more of the plurality of image processing apparatuses, and forcefully cancelling the license for the application granted to the one or more of the plurality of image processing apparatuses upon receiving an enforced deactivation request from a deactivated-device detecting unit the request being associated with a deactivation factor detected by the deactivated-device detecting unit; and an editing unit configured to decrement the number of licenses by one upon the application having been granted to be used by the one or more of the image processing apparatuses, whereas the editing unit increments the number of licenses by one upon the license for the application granted to the one or more of the plurality of image processing apparatuses having been canceled.

2. The license management server according to claim 1, further comprising an error notifying unit, wherein the determining unit is further configured to determine that the license for the application is not to be granted to the one or more of the plurality of image processing apparatuses upon the number of licenses associated with the license identification information in the storage unit being zero, and the error notifying unit is configured to issue a notification of an error upon the determining unit having determined that the license for the application is not to be granted to the one or more of the plurality of image processing apparatuses.

3. The license management server according to claim 1, wherein the storage unit is further configured to store an in-use-device identification list, in which device identification information for identifying, among the plurality of image processing apparatuses, an image processing apparatus that is currently using the application associated with the license identification information, and the editing unit is further configured to enter, upon the application being granted to be used by the one or more of the plurality of image processing apparatuses, the device identification information about the one or more of the plurality of image processing apparatuses in the in-use-device identification list and to decrement the number of licenses associated with the license identification information by one.

4. The license management server according to claim 1, wherein the storage unit is further configured to store a forcefully-deactivated-device-identification list containing device identification information of the one or more of the plurality of image processing apparatuses whose granted license is forcefully cancelled, the device identification information being associated with the license identification information, and upon the license for the application granted to the one or more of the plurality of image processing apparatuses having been forcefully cancelled, the editing unit is further configured to enter the device identification information regarding the one or more of the plurality of image processing apparatuses in the forcefully-deactivated-device identification list and to increment the number of licenses associated with the license identification information by one.

5. The license management server according to claim 4, wherein upon the deactivation request being issued from the one or more of the plurality of image processing apparatuses whose device identification information is contained in the forcefully-deactivated-device identification list and being received, the editing unit is configured to delete the device identification information regarding the one or more of the plurality of image processing apparatuses from the forcefully-deactivated device identification list.

6. A license management method comprising:

storing, at a license management server, license identification information, by which a license for use in licensing one or more of a plurality of image processing apparatuses to use an application is identified, the license identification information being associated with a number of available licenses in a storage unit;

receiving, at the license management server any one of an activation request, from the one or more of the plurality of image processing apparatuses, that the license for the application be granted to the one or more of the plurality of image processing apparatuses, and a deactivation request that the license for the application granted to the one or more of the plurality of image processing apparatuses be canceled;

determining, by the license management server accessing the storage unit upon receiving the activation request, that the license for the application is to be granted to the one or more of the plurality of image processing apparatuses upon the number of licenses associated with the license identification information in the storage unit being equal to one or greater;

performing by the license management server, an activation to grant the one or more of the plurality of image processing apparatuses, the license for the application upon the license being determined to be granted to the one or more of the plurality of image processing apparatuses, a deactivation to cancel the license for the application granted to the one or more of the plurality of image processing apparatuses upon the license management server receiving the deactivation request from the one or more of the plurality of image processing apparatuses, and forcefully cancelling the license for the application granted to the one or more of the plurality of image processing apparatuses upon receiving an enforced deactivation request from a deactivated-device detecting unit, the request being associated with a deactivation factor detected by the deactivated-device detecting unit; and editing, using the license management server, by decrementing by one the number of licenses upon the application having been granted to be used by the one or more of the plurality of image processing apparatuses, whereas the number of licenses is incremented by one upon the license for the application granted to the one or more of the plurality of image processing apparatuses having been cancelled.

7. The license management method according to claim 6, further comprising issuing a notification of an error, wherein
the determining includes determining that the license for the application is not to be granted to the one or more of the plurality of image processing apparatuses upon the number of licenses associated with the license identification information in the storage unit being zero, and
the issuing includes issuing a notification of an error upon the license for the application is not being granted to the one or more of the plurality of image processing apparatuses at the determining.

8. The license management method according to claim 6, wherein
the storing includes further storing an in-use-device identification list, in which device identification information for identifying, among the plurality of image processing apparatuses, an image processing apparatus that is currently using the application associated with the license identification information, and
the editing includes entering, upon the application being granted to be used by the one or more of the plurality of image processing apparatuses, the device identification information regarding the one or more of the plurality of image processing apparatuses in the in-use-device identification list and decrementing the number of licenses associated with the license identification information by one.

9. The license management method according to claim 6, wherein
the storing includes further storing a forcefully-deactivated-device-identification list containing device identification information of the one or more of the plurality of image processing apparatuses whose granted license is forcefully cancelled, the device identification information being associated with the license identification information, and
upon the license for the application granted to the one or more of the plurality of image processing apparatuses having been forcefully cancelled, the editing includes entering the device identification information regarding the one or more of the plurality of image processing apparatuses in the forcefully-deactivated-device identification list and incrementing the number of licenses associated with the license identification information by one.

10. The license management method according to claim 9, wherein upon the deactivation request being issued from the one or more of the plurality of image processing apparatuses whose device identification information is contained in the forcefully-deactivated-device identification list and received, the editing includes deleting the device identification information regarding the one or more of the plurality of image processing apparatuses from the forcefully-deactivated device identification list.

11. A non-transitory computer-readable medium including a computer program product stored thereon, the computer program product comprising instructions, which when executed by a computer, cause the computer to perform functions including:
storing license identification information, by which a license for use in licensing one or more of a plurality of image processing apparatuses to use an application is identified, the license identification information being associated with a number of available licenses in a storage unit;
receiving any one of an activation request, from the one or more of the plurality of image processing apparatuses, that the license for the application be granted to the one or more of the plurality of image processing apparatuses, and a deactivation request that the license for the application granted to the one or more of the plurality of image processing apparatuses be canceled;
determining that the license for the application is to be granted to the one or more of the plurality of image processing apparatuses upon the number of licenses associated with the license identification information in the storage unit being equal to one or greater;
performing,
an activation to grant the one or more of the plurality of image processing apparatuses, the license for the application upon the license being determined to be granted to the one or more of the plurality of image processing apparatuses,
a deactivation to cancel the license for the application granted to the one or more of the plurality of image processing apparatuses upon the license management server receiving the deactivation request from the one or more of the plurality of image processing apparatuses, and
forcefully cancelling the license for the application granted to the one or more of the plurality of image processing apparatuses upon receiving an enforced deactivation request from a deactivated-device detecting unit, the request being associated with a deactivation factor detected by the deactivated-device detecting unit; and
editing by decrementing by one the number of licenses upon the application having been granted to be used by the one or more of the plurality of image processing apparatuses, whereas the number of licenses is incremented by one upon the license for the application granted to the one or more of the plurality of image processing apparatuses having been cancelled.

12. The non-transitory computer-readable medium according to claim 11, further comprising issuing a notification of an error, wherein
the determining includes determining that the license for the application is not to be granted to the one or more of the plurality of image processing apparatuses upon the number of licenses associated with the license identification information in the storage unit being zero, and
the issuing includes issuing a notification of an error upon the license for the application not being granted to the one or more of the plurality of image processing apparatuses at the determining.

13. The non-transitory computer-readable medium according to claim 11, wherein
the storing includes further storing an in-use-device identification list, in which device identification information for identifying, among the plurality of image processing apparatuses, an image processing apparatus that is currently using the application associated with the license identification information, and
the editing includes entering, upon the application being granted to be used by the one or more of the plurality of image processing apparatuses, the device identification information regarding the one or more of the plurality of image processing apparatuses in the in-use-device identification list and decrementing the number of licenses associated with the license identification information by one.

14. The non-transitory computer-readable medium according to claim 11, wherein the storing includes further storing a forcefully-deactivated-device-identification list containing device identification information of the one or more of the plurality of image processing apparatuses whose granted license is forcefully cancelled, the device identification information being associated with the license identification information, and upon the license for the application granted to the one or more of the plurality of image processing apparatuses having been forcefully cancelled, the editing includes entering the device identification information regarding the one or more of the plurality of image processing apparatuses in the forcefully-deactivated-device identification list and incrementing the number of licenses associated with the license identification information by one.

15. The non-transitory computer-readable medium according to claim 11, wherein upon the deactivation request being issued from the one or more of the plurality of image processing apparatuses whose device identification information is contained in the forcefully-deactivated-device identification list and received, the editing includes deleting the device identification information regarding the one or more of the plurality of image processing apparatuses from the forcefully-deactivated device identification list.

* * * * *